US012781514B2

(12) United States Patent
Larsson et al.

(10) Patent No.: US 12,781,514 B2
(45) Date of Patent: Nov. 3, 2026

(54) METHOD TO MANUFACTURE A BEVEL ON A BUILDING PANEL AND SUCH A BUILDING PANEL

(71) Applicant: Välinge Innovation AB, Viken (SE)

(72) Inventors: Lucas Larsson, Höganäs (SE); Per Josefsson, Ramlösa (SE); Martin Bjeremyr, Helsingborg (SE); Peter Derelöv, Helsingborg (SE)

(73) Assignee: VÄLINGE INNOVATION AB, Viken (SE)

(*) Notice: Subject to any disclaimer, the term of this patent is extended or adjusted under 35 U.S.C. 154(b) by 243 days.

(21) Appl. No.: 18/243,282

(22) Filed: Sep. 7, 2023

(65) Prior Publication Data

US 2024/0076880 A1 Mar. 7, 2024

(30) Foreign Application Priority Data

Sep. 7, 2022 (SE) .................................... 2251039-0

(51) Int. Cl.
*E04F 15/02* (2006.01)
*B23C 3/12* (2006.01)
(Continued)

(52) U.S. Cl.
CPC .......... *E04F 15/02033* (2013.01); *B23C 3/12* (2013.01); *E04F 13/0866* (2013.01);
(Continued)

(58) Field of Classification Search
CPC . E04B 5/023; E04B 1/541; E04B 5/00; E04B 1/14; E04B 9/22; E04F 2201/043;
(Continued)

(56) References Cited

U.S. PATENT DOCUMENTS

2006/0179773 A1* 8/2006 Pervan .................. B44C 5/0469
52/592.1
2010/0251658 A1 10/2010 Boucké
2011/0250404 A1* 10/2011 Pervan .............. E04F 15/02038
428/206

FOREIGN PATENT DOCUMENTS

DE 102006052555 B3 1/2008
EP 1683929 A2 7/2006
(Continued)

OTHER PUBLICATIONS

U.S. Appl. No. 18/243,224, filed Sep. 7, 2023, Lucas Larsson.
(Continued)

*Primary Examiner* — Vishal I Patel
(74) *Attorney, Agent, or Firm* — Boone IP Law

(57) ABSTRACT

A method to manufacture a bevel at least partly along at least one edge of a building panel, such as a floor panel or wall panel, where the building panel includes a polymer-based material. The method includes creating an indentation in an edge portion of the at least one edge of the building panel, where the indentation is located at a distance from a surface of the building panel, in a direction substantially perpendicular to the surface of the building panel. The method further including heating at least an area between the indentation and the surface of the building panel in which the bevel is to be formed and applying pressure to the surface for forming a bevel of the building panel.

15 Claims, 13 Drawing Sheets

(51) Int. Cl.
*E04F 13/08* (2006.01)
*E04F 13/18* (2006.01)
*E04F 15/10* (2006.01)

(52) U.S. Cl.
CPC ............ *E04F 13/18* (2013.01); *E04F 15/105* (2013.01); *E04F 15/107* (2013.01); *E04F 13/0894* (2013.01); *E04F 15/02038* (2013.01); *E04F 2201/023* (2013.01); *E04F 2201/043* (2013.01)

(58) Field of Classification Search
CPC .......... E04F 2201/023; E04F 15/02038; E04F 13/0894; E04F 15/107; E04F 15/105; E04F 13/18; E04F 13/0866; E04F 15/02033; E04F 15/02; E04F 2201/0146; E04F 21/22; E04F 2201/0153; E04F 2201/042; E04F 2201/0115; E04F 2201/0161; B23C 3/12
See application file for complete search history.

(56) References Cited

FOREIGN PATENT DOCUMENTS

| | | | | |
|---|---|---|---|---|
| EP | 3115195 | A1 * | 1/2017 | ............ E04F 15/107 |
| EP | 4088949 | A1 | 11/2022 | |
| EP | 4088950 | A1 | 11/2022 | |
| WO | 2008/033081 | A1 | 3/2008 | |
| WO | 2022/238858 | A1 | 11/2022 | |

OTHER PUBLICATIONS

U.S. Appl. No. 18/243,339, filed Sep. 7, 2023, Per Josefsson.
International Search Report and Written Opinion received for PCT Patent Application No. PCT/SE2023/050833, mailed on Oct. 20, 2023, 14 pages.
Swedish Official Action issued by the Swedish Patent and Registration Office (PRV) in Swedish Patent Application No. 2251039-0 on Mar. 1, 2023 (11 pages).
U.S. Appl. No. 19/262,984, filed Jul. 8, 2025, Per Josefsson.

* cited by examiner

METHOD TO MANUFACTURE A BEVEL ON A BUILDING PANEL AND SUCH A BUILDING PANEL

FIELD OF THE INVENTION

The present application relates to the field of building panels, especially floor panels or wall panels. In particular the present application relates to methods of manufacturing a bevel on such a building panel.

TECHNICAL BACKGROUND

Building panels such as Luxury Vinyl Tiles (LVT) or Stone Plastic Composite panels (SPC panels) are examples of very popular building panels, especially flooring panels, which have the advantages of being durable and easy to maintain.

A SPC panel is a more rigid panel than a LVT panel, having a modulus of elasticity of 2 000-12 000 MPa and often containing inorganic fillers, such as chalk, at an amount of 50-90 wt %. A LVT panel usually has a modulus of elasticity of less than 2 000.

However, such panels often have limitations and disadvantages in their manufacturing process, as the core of these panels are often made of highly filled thermoplastic material, thermosetting materials, hard wood based boards or inorganic material such as mineral based materials. These types of cores are usually very hard and therefore rather difficult to make a desirable embossing and/or bevel on. For example, if an SPC board or another thermoplastic board were to be laminated, embossed and/or provided with a bevel it would be necessary to use a lot of surface material to achieve a proper and desirable shape of the embossing and/or bevel.

In manufacturing processes used today this disadvantage is overcome by using high temperatures, high pressure, long pressing timers and/or thick layers of material, e.g. powder or surface layers. This leads to inefficient manufacturing processes or expensive and material consuming manufacturing processes.

SUMMARY

An object of at least embodiments of the present inventive concept is to provide improvements over known art. This object may be achieved by a technique defined herein.

In a first aspect of the present disclosure there is provided a method to manufacture a bevel at least partly along at least one edge of a building panel, such as a floor panel or wall panel, wherein the building panel comprises a polymer-based material, comprising:

- creating an indentation in an edge portion of the at least one edge of the building panel, wherein the indentation is located at a distance from a surface of the building panel in which the bevel is to be formed, in a direction substantially perpendicular to the surface of the building panel,
- heating at least an area between the indentation and the surface of the building panel in which the bevel is to be formed,
- applying pressure to the surface for forming a bevel of the building panel.

The bevel may be formed the edge portion. The bevel may extend at least partly along said at least one edge of the building panel.

The bevel may have any shape, such as V-shaped, U-shaped or arc-shaped. The bevel may be formed in the surface layer, and preferably also in the sub-layer, in a direction substantially perpendicular to a plane defined by the front surface of the building panel.

The shape and dimensions of the bevel may depend on the thickness of the building panel and/or the total thickness of the surface layer and substrate. In an embodiment the shape and dimensions of the bevel may depend on the dimensions and location of a mechanical locking device as described in more detail below.

The bevel may, in a direction perpendicular to the plane defined by the front surface of the building panel, extends between 0.2 mm and 1 mm. In an embodiment where the building panel has a thinner thickness, e.g., between 2 mm. and 5 mm., the bevel may preferably extend between 0.2 mm. and 0.5 mm. in the direction perpendicular to the front surface of the building panel. In another embodiment where the building panel has a thicker thickness, e.g., between 5 mm. and 10 mm., the bevel may preferably extend between 0.5 mm. and 1 mm. in the direction perpendicular to the front surface of the building panel.

The bevel may further be curved with a radius of between 1 mm. and 10 mm.

The bevel may even further, as explained above, depend on the mechanical locking device. In an embodiment the mechanical locking device extends, in a direction parallel to the plane defined by the front surface of the building panel and into the building panel, further than the bevel does. In an embodiment a tongue groove of the mechanical locking device extends, in a direction parallel to the plane defined by the front surface of the building panel and into the building panel, further than the bevel does. In another embodiment a locking groove of the mechanical locking device extends, in a direction parallel to the plane defined by the front surface of the building panel and into the building panel, further than the bevel does.

By creating indentations, a bevel may be formed in a building panel, or a substrate of the building panel, which otherwise may be difficult to shape.

The step of creating an indentation in an edge portion may be made by a milling process or any other process suitable for removing material.

The indentation may preferably extend, in a direction parallel to the plane defining the front surface of the building panel and into the building panel, the same length as or further than the extension of the intended bevel to be formed.

In an embodiment where a mechanical locking device is to be formed in the building panel, the indentation may preferably extend, in a direction parallel to the plane defining the front surface of the building panel and into the building panel, no further than the mechanical locking device, or even more preferred shorter that then mechanical locking device.

In another embodiment a tongue groove, to be formed, of the mechanical locking device extends, after it has been formed, in a direction parallel to the plane defined by the front surface of the building panel and into the building panel, further in than the indentation does. In yet another embodiment a locking groove, to be formed, of the mechanical locking device extends, after it has been formed, in a direction parallel to the plane defined by the front surface of the building panel and into the building panel, further in than the indentation does. This is preferred since the indentations should not affect either the process of forming the mechanical locking device or the dimensions of such mechanical locking device. Thus, the remaining indentations, after the bevel has been formed, are preferably to be removed during the forming of the mechanical locking device.

In fact, regardless of the final process steps along the edges of the building panel, e.g., calibrating, the remaining indentations, after the bevel has been formed, are preferably to be removed during such final process step. Thus, the indentations may preferably be temporary features of the edge of the building panel which during a final shaping process i.e. a calibrating process, is no longer present in its original shape.

In an embodiment the height of the opening of the indentation, prior to forming the bevel, is about equal to the height of the bevel.

In another embodiment the height of the opening of the indentation, prior to forming the bevel, exceeds the height of the bevel.

In an embodiment the length, in the direction parallel to the front surface of the building panel and into the building panel, of the indentation is about equal to the radius of the bevel.

In an embodiment the length, in the direction parallel to the front surface of the building panel and into the building panel, of the indentation exceeds the radius of the bevel.

A bevel is often formed in edges situated in the top surface of the building panel as the bevel contributes to the aesthetic appearance of the building panel, therefore is the surface of the building panel, as described above, usually the front surface of the building panel. However, it may optionally be the back surface of the building panel.

The pressure applied when forming the bevel may be 1-20 bar, depending on the temperature in the material when forming the bevel.

In an embodiment the temperature in the material when forming the bevel is 40-220° C., or 75-180° C. and it may depend on various properties, such as the thickness of the material, the type of material, etc.

In an embodiment the polymer-based material of the building panel is a thermoplastic material, preferably chosen from a group comprising: polyvinyl chloride (PVC), polyethylene terephthalate (PET), polyvinyl butyral (PVB), polybutylene terephthalate (PBT), polyethylene (PE), polystyrene (PS), polypropylene (PP), polycarbonate (PC), polyvinyl acetate (PVAc), ethylene-vinyl acetate (EVA), polyacrylate methacrylate, polymethylmethacrylate (PMMA), acrylonitrile butadiene styrene (ABS), thermoplastic polyurethane (TPU), and/or a combination thereof.

The building panel may comprise an amount of at least 10 wt %, at least 15 wt % or at least 20 wt % of the polymer-based material, such as the thermoplastic material.

In an embodiment the building panel comprises a substrate and a surface layer. The substrate is formed from a substrate material which may comprise a polymer-based material. The surface layer may comprise a decorative layer and/or a wear layer. The substrate may be a single-layer substrate or a multi-layer substrate.

The surface layer may be a single-layer surface layer or a multi-layer surface layer.

In an embodiment the decorative layer is a printed polymer-based layer. In another embodiment the decorative layer may be a coloured powder layer, a paper sheet, a polymer-based sheet, a wood-based sheet, a wood veneer, a cork-based sheet, or a fabric, woven or non-woven.

In an embodiment the wear layer may be a wear resistant foil, a wear layer having wear resistant particles and/or a lacquered layer and/or a coating layer.

The polymer-based material of the substrate may be a thermoplastic material, preferably chosen from a group comprising: polyvinyl chloride (PVC), polyethylene terephthalate (PET), polyvinyl butyral (PVB), polybutylene terephthalate (PBT), polyethylene (PE), polystyrene (PS), polypropylene (PP), polycarbonate (PC), polyvinyl acetate (PVAc), ethylene-vinyl acetate (EVA), polyacrylate methacrylate, polymethylmethacrylate (PMMA), acrylonitrile butadiene styrene (ABS), thermoplastic polyurethane (TPU), and/or a combination thereof.

The substrate material may include an amount of at least 10 wt %, at least 15 wt % or at least 20 wt % of the polymer-based material, such as the thermoplastic material.

The substrate material may comprise an amount of 10-95 wt %, 15-85 wt %, or 20-70 wt % of the polymer-based material, such as the thermoplastic material.

The substrate material may further include filler/s, being at least one or more of an organic filler, an inorganic filler, or a combination thereof.

Examples of organic fillers are fibres of coconut or bamboo and rice husks. These types of organic fillers are often cost efficient and easy to get hold of. The substrate material may comprise 1-70 wt % organic filler, or 30-70 wt % organic filler.

Examples of inorganic fillers are calcium carbonate ($CaCO_3$), barium sulphate ($BaSO_4$), talc, and/or a combination thereof. These types of fillers are especially cost efficient and easy to get a hold of.

In an embodiment the substrate comprises a mineral-based filler and an amount of 1-80 wt % of the mineral based filler.

The inorganic filler of the substrate material may be a mineral-based filler such as calcium carbonate ($CaCO_3$).

The substrate material may further comprise a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. The substrate material forming the substrate may comprise a plasticizer of an amount of 1-30 wt %, or 2-15 wt %. A plasticizer provides the substrate with desirable formable properties.

An alternative way of creating the desirable formable properties of the substrate is for the substrate to comprise at least two different types of polymers. For example the substrate may comprise a material blend comprising a PVC/PVAc co-polymer, where the PVAc content in the material blend of the substrate may be 1-20 wt % and the PVC content in the material blend may be 80-99 wt %.

A typical SPC substrate which may be preferred to use for this type of application, may include 10-40 wt %, 15-35 wt %, or 20-30 wt % of a thermoplastic material, such as PVC. The SPC core may further include 50-90 wt %, 60-80 wt % or 65-75 wt % of an inorganic filler, such as chalk. The SPC core may further include 0-20 wt %, 1-15 wt % or 2-10 wt % of additives, such as impact modifier, stabilizer, lubricant and/or pigment.

A typical LVT substrate, which also may be preferred to use for this type of application, would have a similar content of material as the SPC substrate above, i.e. 10-40 wt %, 15-35 wt %, or 20-30 wt % of a thermoplastic material, 50-90 wt %, 60-80 wt % or 65-75 wt % of an, usually, inorganic filler and 0-20 wt %, 1-15 wt % or 2-10 wt % of additives, but with the addition of 1-20 wt %, 2-15 wt % or 3-10 wt % of a plasticizer.

In an embodiment the substrate material comprises less than 10 wt % wood-based material, or less than 5 wt % wood-based material, such as 0.5-10 wt %.

In an embodiment the indentation is located at least partly in the substrate. In another embodiment the indentation is located entirely in the substrate. Creating the indentation at least partly or entirely in the substrate is particularly advantageous when the substrate is plastically deformable under pressure and optionally heat. A discussion regarding plastically deformable is presented later in this disclosure.

In alternative embodiments the indentation is located at least partly in the surface layer. In yet another alternative embodiment the indentation is located entirely in the surface layer. Creating the indentation at least partly or entirely in the surface layer is particularly advantageous when the substrate is not sufficiently plastically deformable under pressure and optionally heat.

In an embodiment the indentation is located both in the substrate and the surface layer around the boundary between the two.

In an embodiment the indentation is located partly in the substrate and partly in the surface layer.

The indentation may be formed and extend at least 10%, at least 20% or at least 30% into the surface layer. In an embodiment the indentation may be formed and extend at least 90% into the surface layer.

Preferably, the indentation extends along the entire length of the at least one edge of the building panel along which the bevel is to be formed.

In an embodiment the indentation extends into the edge portion of the at least one edge, in a direction substantially parallel to the surface of the building panel.

In another embodiment the indentation extends in a direction substantially perpendicular to the surface of the building panel in which the bevel is formed.

The indentations are preferably temporary features of the edge of the building panel which during a final shaping process i.e. a calibrating process, is no longer present in its original shape.

The method may further comprise:

cooling the bevel and at least partly the area between the indentation and the surface of the building panel in which the bevel was formed. By adding a cooling process it may become easier to control the elasticity and/or recovery effect of the material/s in the bevel and/or the building panel and in turn control the final appearance of the bevel of the building panel. A further advantage of having a cooling process is that it may provide a broader range of materials which can be used for the building panel, as different material may be prone to elastically go back and/or recover at different temperatures and by adding cooling the elasticity and/or recovery process may be stopped.

In an embodiment cooling is applied during applying pressure to the surface for forming the bevel of the building panel.

The cooling process is preferably an active process in order to shorten the time compared to letting the temperature in the material decrease by means of the surrounding environment. The cooling process may be achieved by a cooling device using air, liquid, gas, solid materials and/or other suitable means. The cooling device may perform the cooling through, e.g., blowing, spraying, evaporation and/or through contact.

The cooling process may be configured to decrease the temperature, in the area of the material where the bevel is formed, between 15% and 40%. Depending on the type of cooling the cooling device uses and the temperature of such cooling the time spent by the cooling process may vary. For example, if cold water is used the cooling process may take between 2 sec. and 20 sec., and if cold air is used the cooling process may take between 30 sec. and 2 min, all depending on the type of cooling and the temperature.

In a second aspect there is provided a method to manufacture a building panel, such as a floor panel or wall panel, wherein the building panel comprises a polymer-based material, comprising:

applying a surface layer on a substrate, wherein the surface layer comprises a decorative layer, applying pressure to form a building panel, and forming a bevel along at least one edge of the building panel with a method according to any one of the above described embodiments.

In an embodiment applying pressure to form a building panel further comprises applying heat.

The method may further comprise:

calibrating at least one edge of the building panel after forming the bevel along the at least one edge of the building panel. Calibrating an edge of the building panel may include making finishing process steps to create the final shape and tolerances of the edges and the building panel. Such finishing process steps could be achieved by, e.g., cutting, milling and/or abrasive.

In an embodiment the step of calibrating the edge may include creating an edge surface substantially perpendicular to the front surface of the building panel. Such calibrating could be achieved by, e.g., cutting, milling and/or abrasive.

In an alternative embodiment the step of calibrating the edge may include creating an angled edge surface, where an edge of the front surface preferably protrudes out from a plane, arranged in the edge of the back surface, extending substantially perpendicular to the front surface. I.e. the angled surface is preferably angled in towards the rest of the building panel, from the front surface to the back surface of the building panel.

In an embodiment the edge surface created by the calibrating step may be a continuous surface or a discontinuous surface comprising several sections.

In yet another embodiment the step of calibrating at least one edge of the building panel comprises creating a mechanical locking device along at least one edge of the building panel, wherein the mechanical locking device is configured for horizontal and/or vertical locking of similar or essentially identical building panels in an assembled position.

Preferably, each indentation may be temporary which is no longer present after calibrating said at least one edge of the building panel.

The method may further comprise:

applying an adhesive on the substrate before applying the surface layer on the substrate such that the adhesive is arranged in between the substrate and the surface layer, or applying an adhesive on the surface layer before being applied on the substrate such that the adhesive is arranged in between the substrate and the surface layer.

In an embodiment the adhesive may be glue.

The amount of adhesive applied between the substrate and the surface layer may be between 50 g/m 2 and 200 g/$m^2$.

In a third aspect there is provided a building panel manufactured by a method according any one of the above described embodiments.

BRIEF DESCRIPTION OF THE DRAWINGS

Embodiments of the invention will be described in the following: reference being made to the appended drawings which illustrate non-limiting embodiments of how the inventive concept can be reduced into practice.

DETAILED DESCRIPTION OF EMBODIMENTS

Figure 1A:
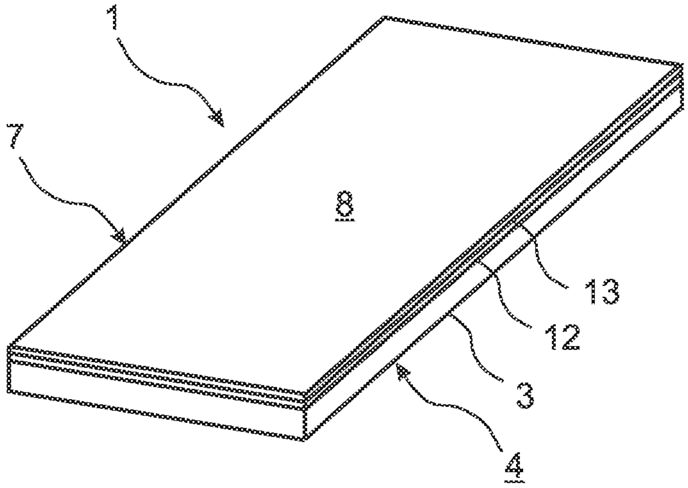
FIG. 1A is a schematic perspective view of a building panel according to an embodiment of the inventive concept.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Generally, in this disclosure, terms like "below" or "lower" typically implies closer to the back surface of the panel or a plane thereof, whereas "above" or "upper" implies closer to the front surface or a plane thereof. Further, the thickness direction of the panel is defined as the vertical direction when the panel lays flat on a surface. The horizontal and vertical direction are applicable definition when the building panel is lays flat on e.g. a floor. Instead of horizontal and vertical directions, the description will also refer to a direction substantially parallel with extension of the decorative surface and a direction substantially perpendicular to the extension of the decorative surface. When a building panel is lays flat on e.g. a floor, the horizontal direction is the same as the direction substantially parallel with the extension of the decorative surface and the vertical direction is the same as the direction substantially perpendicular to the extension of the decorative surface.

In this disclosure a plastically deformable substrate is illustrated and discussed. A definition of a plastically deformable layer, used throughout this disclosure, is one where the shape of the layer may be changed under the application of heat and pressure, and the changed shape may be maintained during and after the application of heat and pressure. For example, a bevel, depressions and/or elevations, may be formed in the material of a plastically deformable layer by application of heat and pressure, and the bevel, depressions and/or elevations may be maintained during and after the application of heat and pressure. A plastically deformable layer may be considered sufficiently plastically deformable when, e.g., a depression of 0.04 mm is formed when an embossing plate with a rill of 1.2 mm depth and a base width of 2 mm is pressed against the layer at a pressure of 20 bar and a temperature of 80° C. for 35 seconds. In further embodiments, a plastically deformable layer may be considered sufficiently plastically deformable when, e.g., a depression of 0.06 mm, such as 0.08 mm, such as 0.1 mm, such as 0.12 mm is formed when an embossing plate with a rill of 1.2 mm depth and a base width of 2 mm is pressed against the layer at a pressure of 20 bar and a temperature of 80° C. for 35 seconds.

In other embodiments, a plastically deformable layer may be considered sufficiently plastically deformable when the plastically deformable layer is more plastically deformable than the substrate. That is, a deeper depression is formed in the plastically deformable layer, as compared to a depression formed in the substrate, when each are pressed with an embossing plate with a rill of 1.2 mm depth and a base width of 2 mm at a pressure of 20 bar and a temperature of 80° C. for 35 seconds. For example, the depression in the plastically deformable layer may be at least 10% deeper, such as at least 25% deeper, such as at least 50% deeper than a depression formed in the substrate when each are pressed with an embossing plate with a rill of 1.2 mm depth and a base width of 2 mm at a pressure of 20 bar and a temperature of 80° C. for 35 seconds.

A purpose of the substrate being plastically deformable is to allow easier and/or deeper bevel forming and/or embossing of the building panel during the manufacturing process.

A method to manufacture different layers into a building panel, such as a floor panel or wall panel, which may be used within the inventive concept of this application may be any suitable methods. For example such method may include applying a surface layer on a substrate, wherein the surface layer comprises a decorative layer, and applying pressure to form a building panel. Applying pressure to form a building panel may further comprise applying heat.

The method may further comprise applying an adhesive on the substrate before applying the surface layer on the substrate such that the adhesive is arranged in between the substrate and the surface layer, or applying an adhesive on the surface layer before being applied on the substrate such that the adhesive is arranged in between the substrate and the surface layer. In such an application the adhesive may be glue. The amount of adhesive applied between the substrate and the surface layer may be between 50 g/m$^2$ and 200 g/m$^2$.

Figure 1B:
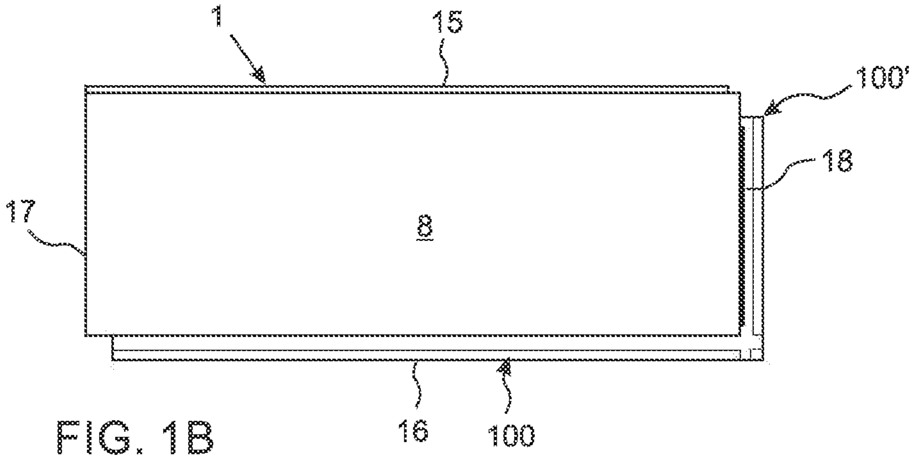
FIG. 1B is a schematic top view of a building panel according to an embodiment of the inventive concept, FIG. 2A schematically illustrates an assembly of a plurality of building panels, FIG. 2B schematically illustrates the finished assembly of FIG. 2A, FIG. 3A schematically illustrates a cross section of two opposite edge portions of two adjacent building panels comprising a mechanical locking device according to an embodiment of the inventive concept for locking the two building panels together, in an unassembled position, FIG. 3B schematically illustrates a cross section of the two opposite edge portions in FIG. 3A, in an assembled position, FIG. 3C schematically illustrates a cross section of the two opposite edge portions in FIG. 3A, during the assembly.

With reference to the figures a building panel 1 is illustrated, see e.g. FIGS. 1A and 1B. The building panel 1 illustrated has a rectangular shape, but may in other embodiments have any other suitable shape, e.g. square, triangular or hexagon. Each building panel 1 may have at least a substrate 3 and a surface layer 7.

The substrate 3 is arranged in the back of the building panel 1. A lower side of the substrate 3 forms a back surface 4 of the building panel 1. An upper side of the substrate 3 is attached to the surface layer 7.

The building panel 1 may be a single layer substrate or a multi-layer substrate. A multi-layer substrate may include two or more layers e.g. a core layer, a backing layer, a balancing layer, a reinforcement layer, mineral-based layer, or sound dampening layer.

The substrate 3 may preferably be configured to be plastically deformable when at least pressure, preferably also heat, is applied to the substrate 3 or the surface layer 7. This is advantageous when e.g. forming a bevel 10 at an edge 15, 16, 17, 18 of the building panel 1 by means of pressing. A method for forming the bevel 10 is described in more detail below.

The substrate 3 comprises a substrate material including a polymer-based material which preferably is a thermoplastic material. The thermoplastic material may be chosen from a group comprising: polyvinyl chloride (PVC), polyethylene terephthalate (PET), polyvinyl butyral (PVB), polybutylene terephthalate (PBT), polyethylene (PE), polystyrene (PS), polypropylene (PP), polycarbonate (PC), polyvinyl acetate (PVAc), ethylene-vinyl acetate (EVA), polyacrylate methacrylate, polymethylmethacrylate (PMMA), acrylonitrile butadiene styrene (ABS), thermoplastic polyurethane (TPU), and/or a combination thereof. The substrate material may comprise an amount of at least 10 wt %, at least 15 wt % or at least 20 wt % of the polymer-based material, such as the thermoplastic material.

The substrate material preferably may comprise less than 10 wt % wood-based material, or less than 5 wt % wood-based material.

The substrate material may further include at least one or more of an organic filler, an inorganic filler, or a combination thereof. Examples of organic fillers are fibres of coconut or bamboo and rice husks. These types of organic fillers are often cost efficient and easy to get hold of. The substrate may comprise 1-70 wt % organic filler, or 30-70 wt % organic filler. Examples of inorganic fillers are calcium carbonate ($CaCO3$), barium sulphate ($BaSO4$), talc, and/or a combination thereof. These types of fillers are especially cost efficient and easy to get a hold of.

The substrate material may further include a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. The substrate material forming the substrate may comprise a plasticizer of an amount of 1-30 wt %, or 2-15 wt %. Having a plasticizer in the substrate material is one way of making the substrate 3 plastically deformable under the influence of pressure and preferably heat.

Another way of making the substrate 3 plastically deformable under the influence of pressure and preferably heat, is to include at least two different types of polymers. For example the substrate material may include a material blend comprising a PVC/PVAc co-polymer, where the PVAc content in the material blend of the substrate is 1-20 wt %.

Further, the substrate material may include a plastisol. Plastisol gives the substrate soft and durable properties. A plastisol is a composition of PVC particles suspended in a plasticizer. The plastisol may further include, usually in minor amounts, extenders, stabilizers, pigments and/or fillers. The ratio between the PVC particles and the plasticizer may preferably be 50/50 by weight.

In an embodiment the sublayer material consists of plastisol.

A typical SPC substrate which may be preferred to use for this type of application, may include 10-40 wt %, 15-35 wt %, or 20-30 wt % of a thermoplastic material, such as PVC. The SPC core may further include 50-90 wt %, 60-80 wt % or 65-75 wt % of an inorganic filler, such as chalk. The SPC core may further include 0-20 wt %, 1-15 wt % or 2-10 wt % of additives, such as impact modifier, stabilizer, lubricant and/or pigment.

A typical LVT substrate, which also may be preferred to use for this type of application, would have a similar content of material as the SPC substrate above, i.e. 10-40 wt %, 15-35 wt %, or 20-30 wt % of a thermoplastic material, 50-90 wt %, 60-80 wt % or 65-75 wt % of an inorganic filler and 0-20 wt %, 1-15 wt % or 2-10 wt % of additives, but with the addition of 1-20 wt %, 2-15 wt % or 3-10 wt % of a plasticizer.

The substrate 3 preferably has a thickness of 1-10 mm, a thickness of 2-8 mm, or a thickness of 3-7 mm.

The surface layer 7 is arranged above and on the substrate 3. An upper side of the surface layer 5 forms a front surface 8 of the building panel 1.

The surface layer 7 may be a single-layer surface layer or a multi-layer surface layer including two or more layers. Preferably, the surface layer 7 includes at least a decorative layer and a wear layer, where the decorative layer is arranged between the substrate 3 and the wear layer and the wear layer is the uppermost layer of the building panel 1.

The decorative layer may be a coloured powder layer, a paper sheet, a polymer-based sheet, a wood-based sheet, a wood veneer, a cork-based sheet, or a fabric, woven or non-woven. The decorative layer may also be a printed layer, e.g. a printed polymer-based sheet.

The wear layer may be a wear resistant foil, a wear layer comprising wear resistant particles and/or a lacquered layer and/or a coated layer. The wear layer is preferably a transparent layer, i.e. a layer which does not affect the appearance of the below arranged decorative layer.

FIG. 1B is a top view of a building panel 1 configured to be horizontally and/or vertically locked to similar or essentially identical building panels 1', 1" in an assembling process.

The building panel 1 in FIGS. 1A and 1B is illustrated as having a rectangular shape but may in other embodiments have a different shape. However, the building panel 1 includes four edges, the first edge 15, the second edge 16, the third edge 17 and the fourth edge 18. The first edge 15 is arranged opposite the second edge 16 and the third edge 17 is arranged opposite the fourth edge 18.

The front surface 8 and the back surface 4 each extends between the first edge 15 and the opposite second edge 16, and between the third edge 17 and the opposite fourth edge 18. The back surface 4 is substantially parallel to the front surface 8 and spaced apart in a direction substantially perpendicular to the front surface 8.

The building panel 1, as said above, comprises a bevel 10, arranged in an upper portion 20 of the building panel 1, at least along the first and second edge 15, 16, i.e. the long sides of a building panel 1 having a rectangular shape. It may not always be desirable to have a bevel along the short sides of a rectangular building panel, but a bevel 10 may be provided along the short sides as well, or along both short sides and long sides.

The upper portion 20 is located at the front surface 8 of the building panel 1 and may include both the surface layer 7 and at least a portion of the substrate 3. A bevel 10 may also be arranged along the third and fourth edges if desired. The bevel 10 may extend along the entire extension of the edges 15, 16 in which the bevel 10 is arranged. Schematic illustrations of the bevel 10 can be seen in FIGS. 3A-5C.

The bevel 10 may extend into the surface layer 7, or into the surface layer 7 and into the substrate 3, in a direction substantially perpendicular to the front surface 8.

Further, the building panel 1 includes at least one type of a mechanical locking device 100, 100' configured to lock similar or essentially identical building panels 1, 1', 1" in an assembled position. Such a mechanical locking device 100, 100' is configured to lock said building panels 1, 1', 1" in a vertical and/or horizontal direction, which also can be referred to as directions substantially perpendicular and/or parallel to the back or front surface 4, 8.

In the illustrated embodiments the building panel 1 is provided with two types of mechanical locking devices, a first mechanical locking device 100, arranged along the first and second edges 15, 16, and a second mechanical locking device 100', arranged along the third and fourth edges 17, 18. The first mechanical locking device 100 is designed such that a first edge 15 of a building panel 1 is configured to be assembled and locked to a second edge 16 of an adjacent building panel 1', 1" and the second edge 16 of the building panel 1 is configured to be assembled and locked to a first edge 15 of another adjacent building panel 1', 1" as the building panels are similar or essentially identical. The same applies to the second mechanical locking device 100' where the third edge 17 of the building pane 1 is configured to be assembled and locked to the fourth edge 18 of an adjacent building panel 1', 1" and the fourth edge 18 of the building panel 1 is configured to be assembled and locked to the third edge 17 of another adjacent building panel 1', 1". Thus, the opposite edges of the building panel 1 are designed to be compatible with each other.

Embodiments of a first mechanical locking device 100 are illustrated in FIGS. 3A-3C and 5A-5C. An embodiment of a second mechanical locking device 100' is illustrated in FIGS. 4A-4C.

Figure 2A:
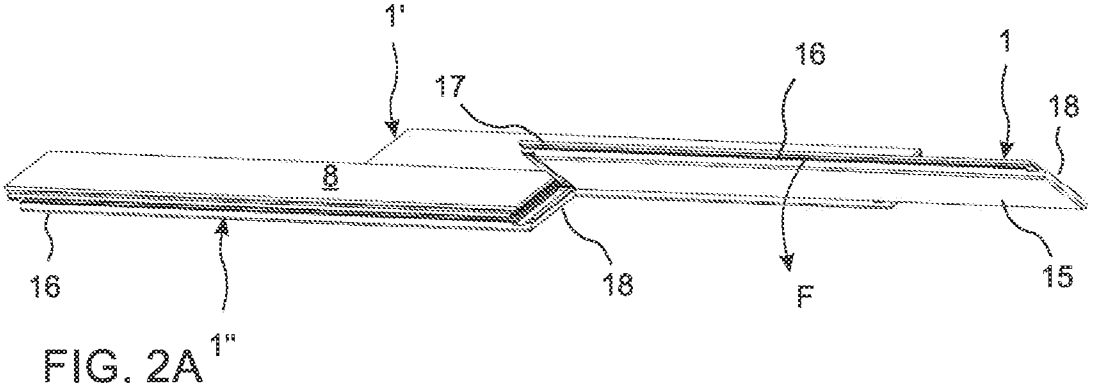
Figure 2B:
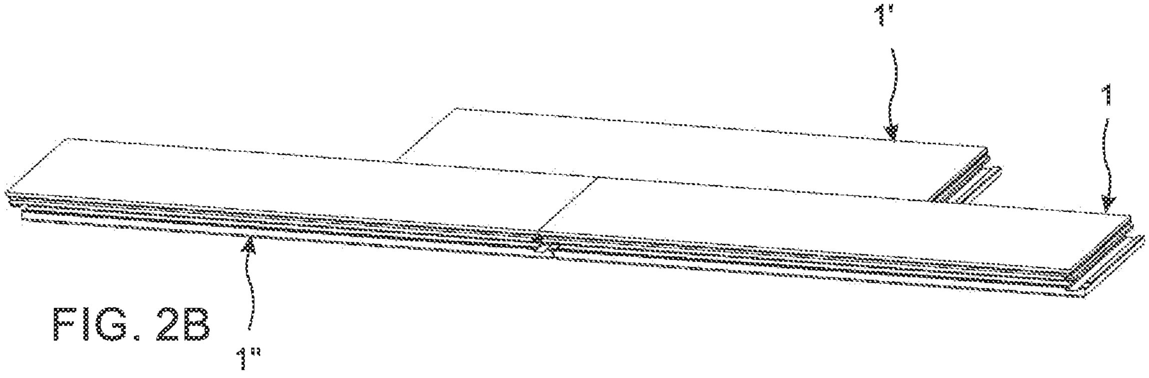

The assembling process of multiple building panels 1, 1', 1" is illustrated in FIGS. 2A and 2B, where a set of building panels 1, 1', 1", such as floor panels, wall panels, ceiling panels, furniture elements or similar, are assembled to each other. A building panel 1 is assembled by firstly arranging its first edge 15 along the second edge 16 of an adjacent building panel 1'. The building panel 1 may preferably be displaced in a direction along the extension of the second edge 16 of the adjacent building panel 1'. After the building panel 1 is displaced into its desired position the first edge 15 of the building panel 1 is, by means of a folding displacement F, locked into the second edge 16 of the adjacent building panel 1' simultaneously as the third edge 17 of the building panel is assembled and locked to a fourth edge 18 of another adjacent building panel 1". The building panel 1 is folded down such that the second edge 16 of the building panel 1 is displaced in a direction substantially perpendicular to the front surface 8 in relation to the first edge 15. The mechanical locking device 100' arranged along the third edge 17 and fourth edge 18 is configured to assemble and lock the adjacent third edge 17 and fourth edge 18 continuously throughout the folding displacement F of the building panel 1.

Figure 3A:
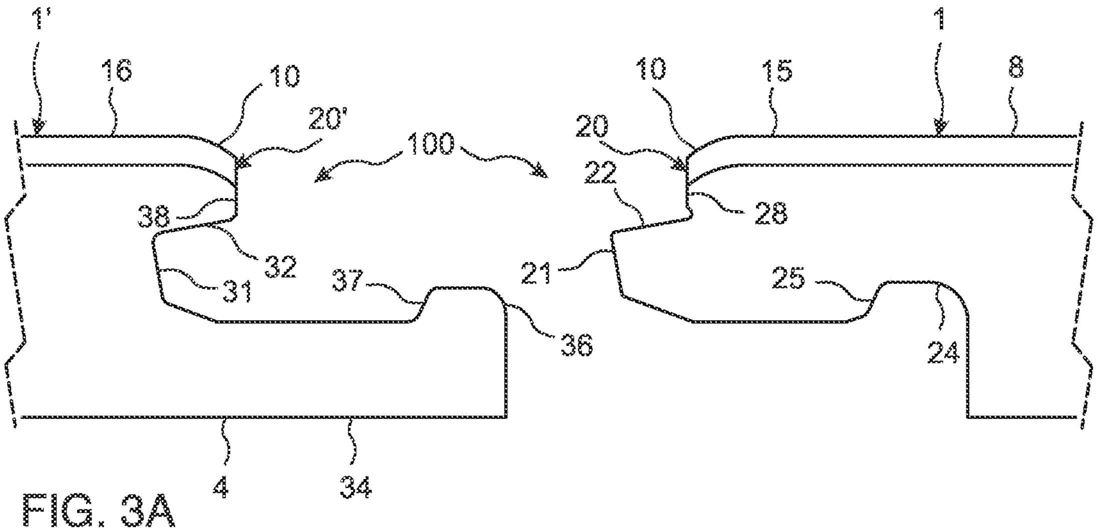
Figure 3B:
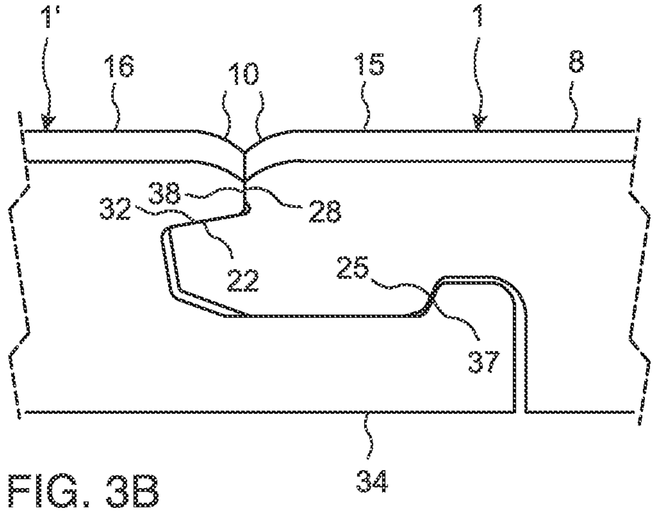
Figure 3C:
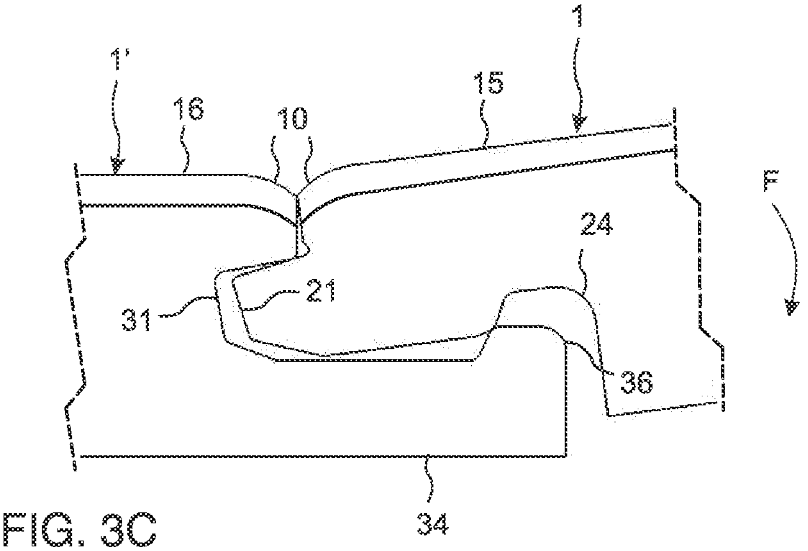
Figure 4A:
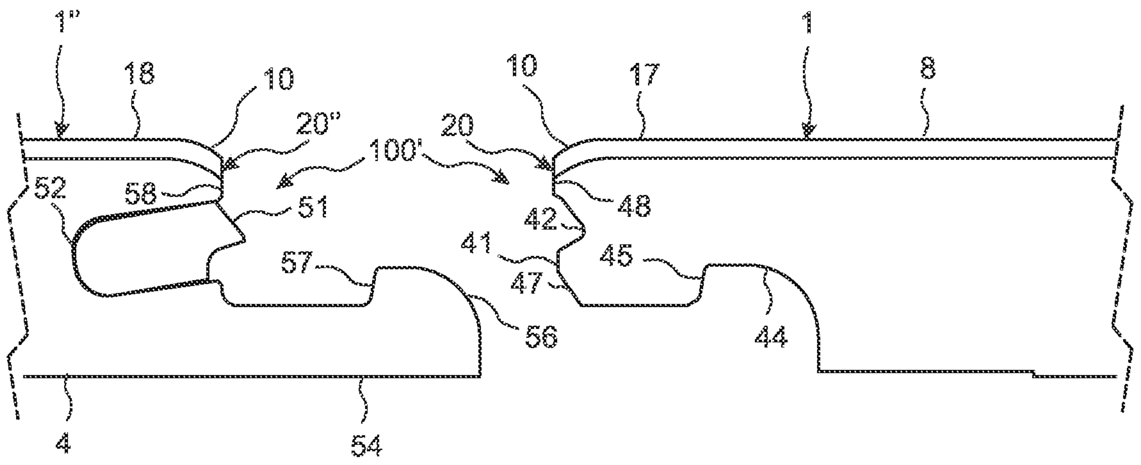
FIG. 4A schematically illustrates a cross section of two opposite edge portions of two adjacent building panels comprising a mechanical locking device according to another embodiment of the inventive concept for locking the two building panels together, in an unassembled position, FIG. 4B schematically illustrates a cross section of the two opposite edge portions in FIG. 4A, in an assembled position, FIG. 4C schematically illustrates a cross section of the two opposite edge portions in FIG. 4A, during the assembly.
Figure 4B:
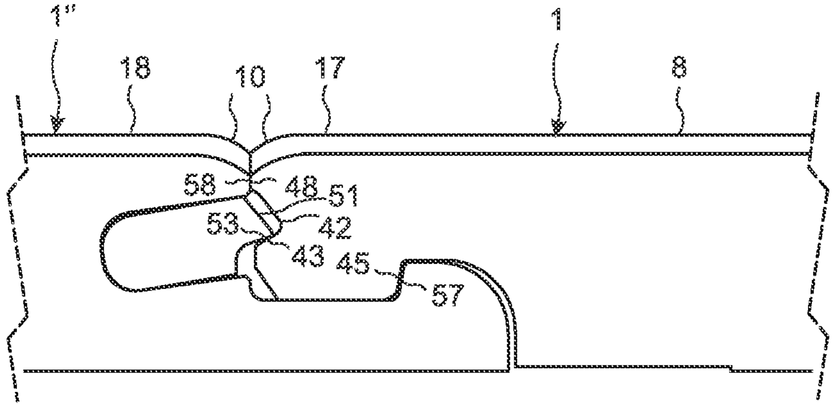
Figure 4C:
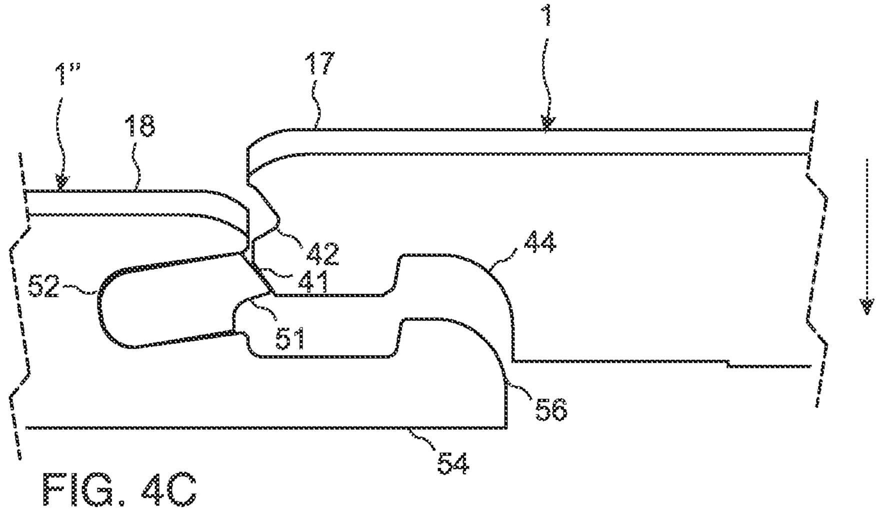

FIGS. 3A, 3B and 3C illustrate a cross section of two opposite edges 15, 16 of two adjacent building panels 1, 1' provided with the first mechanical locking device 100 in an unassembled position, in an assembled position and in a position during the assembly. The two adjacent building panels 1, 1' are assembled by means of the folding displacement as explained above and locked together by means of the mechanical locking device 100. This type of mechanical locking device may be especially advantageous to use along the long sides of a rectangular building panel.

The mechanical locking device 100, at the first edge 15 of the building panel 1, is provided with a locking tongue 21 extending out from the first edge 15. The locking tongue 21 is configured to be received in a tongue groove 31 provided in the second edge 16 of the adjacent building panel 1'. The locking tongue 21 and the tongue groove 31 are configured to lock the two adjacent building panels 1, 1' at least in a direction substantially perpendicular to the front surface 8. In the assembled position an upper surface 22 of the locking tongue 21 is cooperating or even in contact with an upper surface 32 of the tongue groove 31, where the two surfaces 22, 32 creates the lock in at least a direction substantially perpendicular to the front surface 8.

Below the upper surface 32 of the tongue groove 31, seen from the front surface 8, there is provided a locking strip 34 extending out from the second edge 16 of the adjacent building panel 1'. At an outermost end of the locking strip 34 there is provided a locking element 36. The locking element 36 is configured to be received in a locking groove 24 provided at the first edge 15 of the building panel 1. The locking element 36 and the locking groove 24 are configured to lock the two adjacent building panels 1, 1' at least in a direction parallel to the front surface 8. In the assembled position a locking surface 25 of the locking groove 24 is cooperating or even in contact with a locking surface 37 of the locking element 36, where the two locking surfaces 25, 37 creates the lock in at least a direction parallel to the front surface 8.

In the upper edge portion 20, 20' of each building panel 1, 1' there are provided another two locking surfaces 28, 38. The locking surfaces 28, 38 are, in the assembled position, arranged opposite each other, cooperating or even in contact with each other in order to lock the two adjacent building panels 1, 1' in a direction parallel to the front surface 8. Preferably the two locking surfaces 28, 38 create a tight seal in the assembled position. A tight seal has several advantages, such as mitigating the risk of dirt or fluids entering down into the mechanical locking device 100 which could damage the building panels 1, 1', or such as creating a desirable transition between two adjacent building panels 1, 1' in which also the bevel 10 may be favourable. Creating a desirable transition between the adjacent building panels 1, 1' may be especially desirable if a decorative layer of the surface layer 7 is a printed layer of any material since the printed layer then can transition into the adjacent printed layer without a gap, which could interrupt the decorative surface. An interruption in the decorative surface could create an undesirable surface decor when multiple building panels 1, 1', 1" are assembled to create a panel board, e.g. a floor, wall or the like.

The two locking surfaces 28, 38 extend in a direction substantially perpendicular to the front surface 8. The two locking surfaces 28, 38 are the uppermost pair of locking surfaces of the two adjacent building panels 1, 1' in the assembled position.

FIGS. 4A, 4B and 4C illustrate a cross section of two opposite edges 17, 18 of two adjacent building panels 1, 1" provided with the second mechanical locking device 100' in an unassembled position, in an assembled position and in a position during the assembly. The two adjacent building panels 1, 1" are assembled by means of the folding displacement and the continuous vertical displacement of the second edge 16 in relation to the first edge 15 as explained above, and locked together by means of the mechanical locking device 100'. This type of mechanical locking device may be especially advantageous to use along the short sides of a rectangular building panel or for square tiles.

The mechanical locking device 100', at the third edge 17 of the building panel 1, is provided with a locking tongue 41 provided with a tongue groove 42. The tongue groove 42 is configured to receive a displaceable locking tongue 51 arranged in a displaceable tongue groove 52 in the fourth edge 18 of the adjacent building panel 1", in the assembled position. The displaceable locking tongue 51 and the tongue groove 42 are configured to lock the two adjacent building panels 1, 1" at least in a direction substantially perpendicular to the front surface 8.

The displaceable locking tongue 51 may be separate from the rest of the mechanical locking device 100' and arranged within the displaceable tongue groove 52 e.g. by hand or a machine when before or during the assembly of building panels 1, 1', 1". The displaceable locking tongue 51 is configured to be displaced, by being at least partly flexible, within the displaceable tongue groove 52 as the locking tongue 41 at the third edge of the building panel 1 is displaced down, in a direction substantially perpendicular to the front surface 8, towards the assembled position, see FIG. 4C. When the displaceable locking tongue 51 reaches the tongue groove 42 it snaps into a locked position, see FIG. 4B, and locks the two adjacent building panels 1, 1" at least in a direction substantially perpendicular to the front surface 8. In the assembled position a lower locking surface 43 of the tongue groove 42 is cooperating or even in contact with a lower locking surface 53 of the displaceable locking tongue 51, where the two locking surfaces 43, 53 creates a lock of the assembled panels 1, 1" in at least the direction substantially perpendicular to the front surface 8.

Below the displaceable tongue groove 52, seen from the front surface 8, there is provided a locking strip 54 extending out from the fourth edge 18 of the adjacent building panel 1". At an outermost end of the locking strip 54 there is provided a locking element 56. The locking element 56 is configured to be received in a locking groove 44 provided at the third edge 17 of the building panel 1. The locking element 56 and the locking groove 44 are configured to lock the two adjacent building panels 1, 1" at least in a direction substantially parallel to the front surface 8. In the assembled position a locking surface 45 of the locking groove 44 is cooperating or even in contact with a locking surface 57 of the locking element 56, where the two locking surfaces 45, 57 creates the lock in at least the direction substantially parallel to the front surface 8.

In the upper edge portion 20, 20" of each building panel 1, 1" there is provided another two locking surfaces 48, 58. The locking surfaces 48, 58 are, in the assembled position, arranged opposite each other, cooperating or even in contact with each other in order to lock the two adjacent building panels 1, 1" in a direction substantially parallel to the front surface 8. Preferably the two locking surfaces 48, 58 creates a tight seal in the assembled position. A tight seal has several advantages, such as mitigating the risk of dirt or fluids entering down into the mechanical locking device 100' which could damage the building panels 1, 1', or such as creating a desirable transition between two adjacent building panels 1, 1" in which also the optional bevel 10 may be favourable. Creating a desirable transition between the adjacent building panels 1, 1" may be especially desirable if a decorative layer of the surface layer 7 is a printed layer of any material since the printed layer then can transition into the adjacent printed layer without a gap, which could interrupt the decorative surface. An interruption in the decorative surface could create an undesirable surface decor when multiple building panels 1, 1', 1" are assembled to create a panel board, e.g. a floor, wall or the like.

The two locking surfaces 48, 58 extend in a direction substantially perpendicular to the front surface 8. The two locking surfaces 48, 58 are the uppermost pair of locking surfaces of the two adjacent building panels 1, 1" in the assembled position.

Figure 5A:
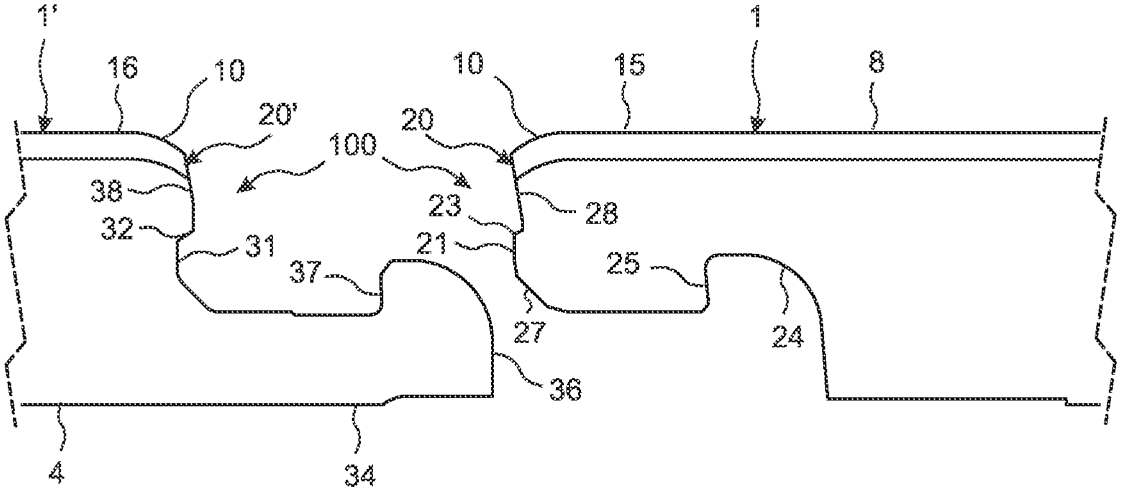
FIG. 5A schematically illustrates a cross section of two opposite edge portions of two adjacent building panels comprising a mechanical locking device according to yet another embodiment of the inventive concept for locking the two building panels together, in an unassembled position, FIG. 5B schematically illustrates a cross section of the two opposite edge portions in FIG. 5A, in an assembled position, FIG. 5C schematically illustrates a cross section of the two opposite edge portions in FIG. 5A, during the assembly, FIG. 6 schematically illustrates a side view of a cross section of a building panel prior to creating the intended edges of a finished building panel, FIG. 7A schematically illustrates a first step of a method to create the intended edges of a building panel, according to an embodiment of the inventive concept.
Figure 5B:
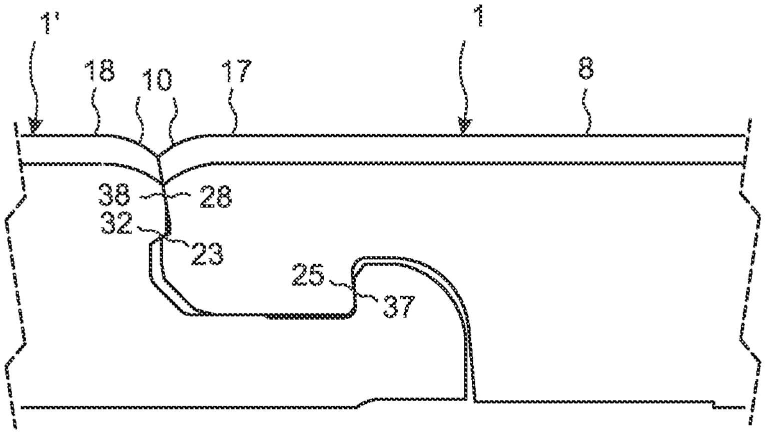
Figure 5C:
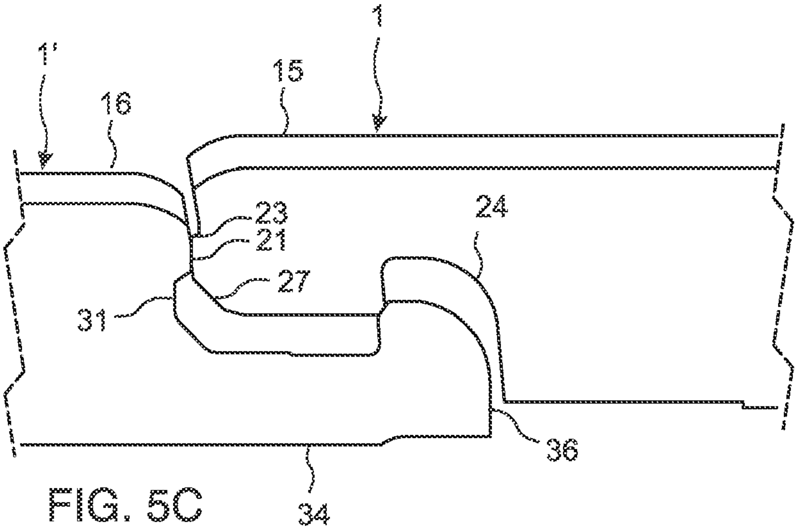

FIGS. 5A, 5B and 5C illustrate a cross section of two opposite edges 15, 16 of two adjacent building panels 1, 1' provided with an alternative first mechanical locking device 100 in an unassembled position, in an assembled position and in a position during the assembly. With this alternative mechanical locking device 100 the two adjacent building panels 1, 1' are assembled by means of a vertical displacement, instead of a folding displacement, of the building panel 1 in relation to the adjacent building panel 1'.

The mechanical locking device 100, at the first edge 15 of the building panel 1, is provided with a locking tongue 21 having a ridge 23. The ridge 23 is configured to receive an upper surface 32 of a tongue groove 31 provided in the second edge 16 of the adjacent building panel 1'. The ridge 23 and the upper surface 32 of the tongue groove 31 are configured to lock the two adjacent building panels 1, 1' at least in a direction perpendicular to the front surface 8. When the ridge 23 reaches the upper surface 32 of the tongue groove 31 it snaps into a locked position, see FIG. 5B, and locks the two adjacent building panels 1, 1' at least in a direction perpendicular to the front surface 8.

In the assembled position the ridge 23 of the locking tongue 21 is cooperating or even in contact with the upper surface 32 of the tongue groove 31, creating the lock in at least a direction perpendicular to the front surface 8.

Below the upper surface 32 of the tongue groove 31, seen from the front surface 8, there is provided a locking strip 34 extending out from the second edge 16 of the adjacent building panel 1'. At an outermost end of the locking strip 34 there is provided a locking element 36. The locking element 36 is configured to be received in a locking groove 24 provided at the first edge 15 of the building panel 1. The locking element 36 and the locking groove 24 are configured to lock the two adjacent building panels 1, 1' at least in a direction substantially parallel to the front surface 8. In the assembled position a locking surface 25 of the locking groove 24 is cooperating or even in contact with a locking surface 37 of the locking element 36, where the two locking surfaces 25, 37 creates the lock in at least a direction substantially parallel to the front surface 8.

In the upper edge portion 20, 20' of each building panel 1, 1' there are provided another two locking surfaces 28, 38. The locking surfaces 28, 38 are, in the assembled position, arranged opposite each other, cooperating or even in contact with each other in order to lock the two adjacent building panels 1, 1' in a direction substantially parallel to the front surface 8. Preferably the two locking surfaces 28, 38 create a tight seal in the assembled position. A tight seal has several advantages, such as mitigating the risk of dirt or fluids entering down into the mechanical locking device 100 which could damage the building panels 1, 1', or such as creating a desirable transition between two adjacent building panels 1, 1' in which also the bevel 10 may be favourable. Creating a desirable transition between the adjacent building panels 1, 1' may be especially desirable if a decorative layer of the surface layer 7 is a printed layer of any material since the printed layer then can transition into the adjacent printed layer without a gap, which could interrupt the decorative surface. An interruption in the decorative surface could create an undesirable surface decor when multiple building panels 1, 1', 1" are assembled to create a panel board, e.g. a floor, wall or the like.

The two locking surfaces 28, 38 extend in a direction substantially perpendicular to the front surface 8. The two locking surfaces 28, 38 are the uppermost pair of locking surfaces of the two adjacent building panels 1, 1' in the assembled position.

An advantage with having a pressed bevel (10) as described herein in combination with a mechanical locking device 100 as illustrated in FIGS. 4A-4C and 5A-5C, where the building panels 1, 1', 1" are assembled by a substantially vertical displacement, is that the bevel (10) may act as a guiding surface for an angled surface 27, 47 of the locking tongue 21, 41. This may occur when the building panel 1 to be assembled is arranged slightly overlapping the adjacent building panel 1', 1". The pressed bevel (10) with its seamless surface may then provide a smooth sideway movement of the building panel 1 such that the building panel 1 to be assembled is displaced in the correct position.

Figure 6:
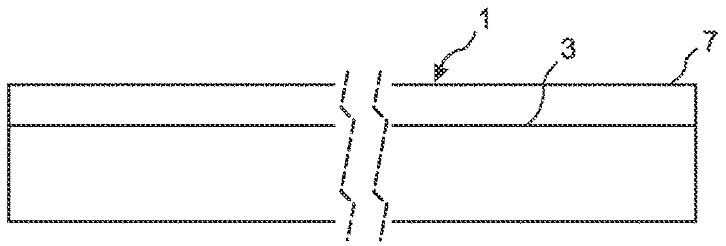

FIGS. 6-13C illustrate different steps of a possible set up for processing the edges 15, 16, 17, 18 of a building panel 1, where FIG. 6 illustrate a building panel 1 with the substrate 3 and the surface layer 7 after being joined together by pressure and preferably also heat.

The set up for a final processing of the edges 15, 16, 17, 18 of a building panel 1 illustrated in FIGS. 6-13C is particularly advantageous when the building panel 1 has a substrate 3 which is not, or at least not sufficiently, plastically deformable. However, FIGS. 14A-14D and 15A-15E illustrate possible set ups for a final processing of the edges 15, 16, 17, 18 of a building panel 1 having a substrate 3 which is sufficiently plastically deformable to be deformed during pressing.

Figure 7A:
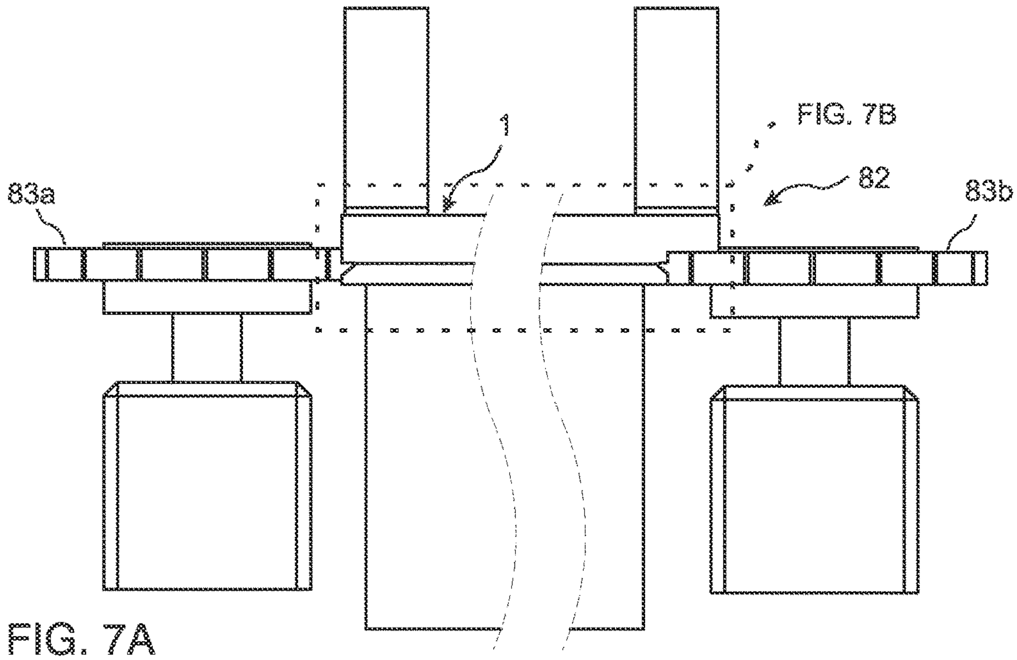
FIG. 7B is a detailed view of FIG. 7A, FIG. 7C schematically illustrates a side view of a cross section of the building panel after the first step in FIG. 7A, FIG. 8A schematically illustrates a second step of a method to create the intended edges of a building panel, according to an embodiment of the inventive concept.
Figure 7B:
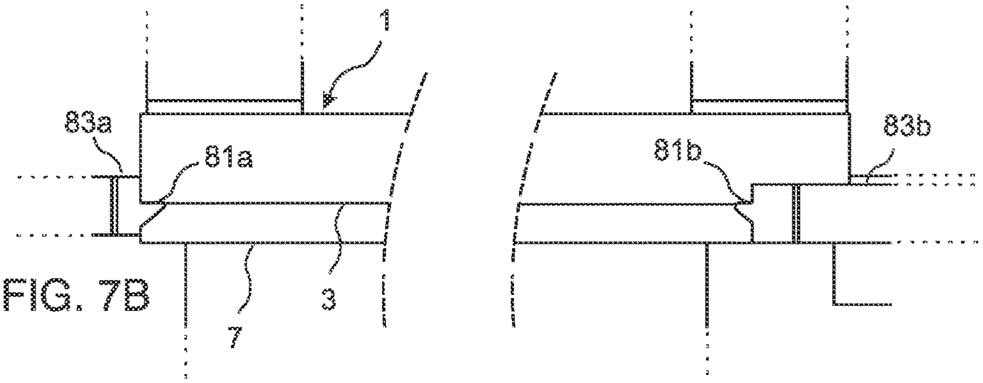
Figure 7C:
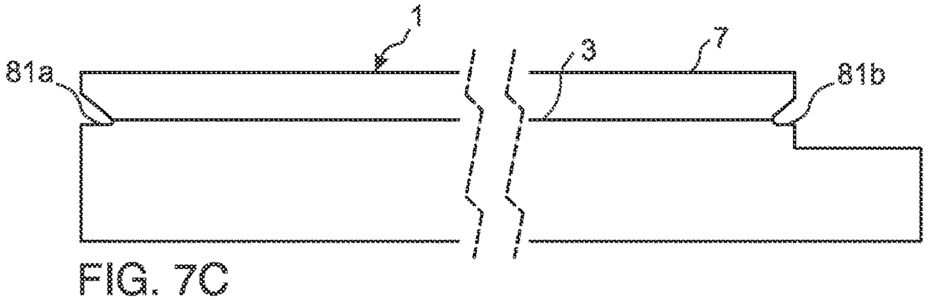

It is possible to form a bevel 10 along edges of the building panel 1 directly after the building panel 1 has been formed by means of pressure, and preferably also heat but in order to mitigate the forming of the bevel 10 even further a process of creating an indentation 81*a*, 81*b* is performed. A possible way of creating an indentation 81*a*, 81*b* is illustrated in FIGS. 7A-7C.

In this process the building panel 1 is placed in or transported to, preferably by means of a conveyor belt, a milling process 82. The building panel 1 is often processed with its substrate 3 facing upwards and its surface layer 7 facing downwards, but it may of course be processed the other way around in an alternative embodiment, with its substrate 3 facing downwards and its surface layer 7 facing upwards.

A milling device 83*a*, 83*b* is arranged on each side of the building panel 1. The milling devices 83*a*, 83*b* are configured to each create an indentation 81*a*, 81*b* along the edges 15, 16 of the building panel 1 in which the bevels 10 are to be formed. The milling devices 83*a*, 83*b* may also configured to create an indentation 81, 81*b* suitable for the type of mechanical locking device 100, 100' later created in the edges 15, 16. A purpose to do so is that the indentation 81*a*, 81*b* then will not affect or interfere with the proportions, shapes, and functions of the later created mechanical locking device 100, 100', see FIGS. 13A-13C.

Advantages of creating the indentations 81*a*, 81*b* before forming the bevel 10 are that space is created for material to be displaced during the pressing and forming of the bevel, decreasing the risk of unwanted excess material gathering which later has to be removed, and decreasing the tendency of the material to elastically go back and/or recover and changing the properties and shape of the bevel 10.

In the illustrated example, each milling device 83*a*, 83*b* is configured to create the indentations 81*a*, 81*b* mainly in the surface layer 7 in the area close to the substrate 3 at the edge portion 20, 20', but may be created at least partly in the substrate 3 at the edge portion 20, 20' in alternative embodiments. The indentations 81*a*, 81*b* may preferably be created in the boundary between the surface layer 7 and the substrate 3 at the edge portion 20, 20'. The indentation 81*a*, 81*b* may be formed and extend at least 10%, at least 20% or at least 30% into the surface layer. In an embodiment the indentation 81*a*, 8*b* may be formed and extend at least 90% into the surface layer.

Figure 13A:
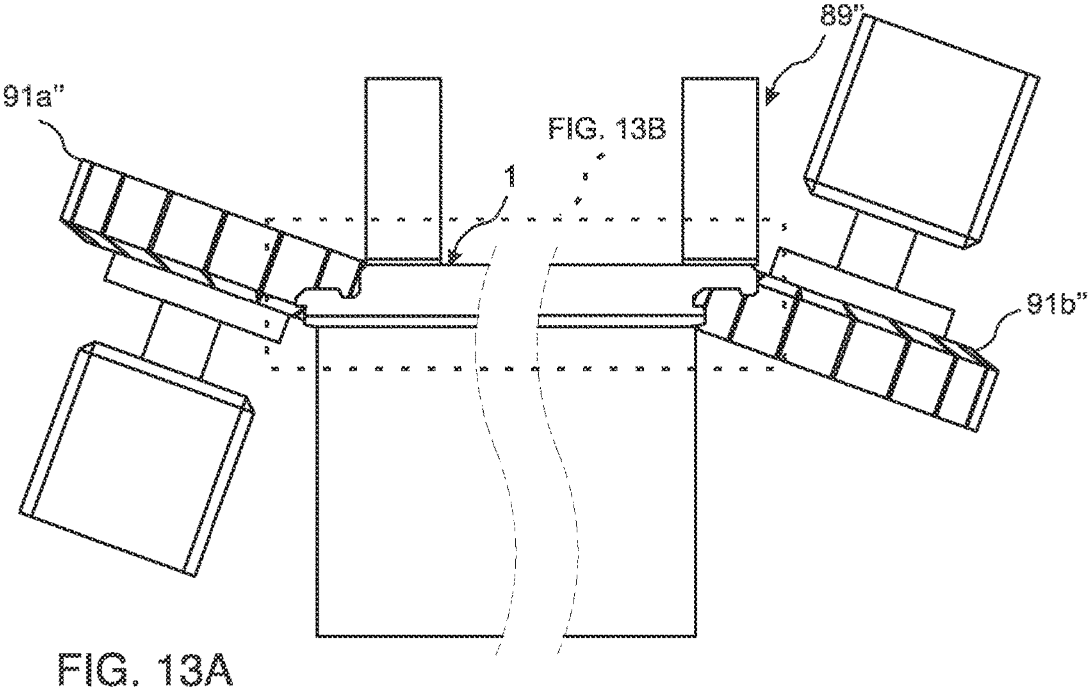
FIG. 13B is a detailed view of FIG. 13A, FIG. 13C schematically illustrates a side view of a cross section of the building panel after the step in FIG. 13A, FIG. 14A schematically illustrates a side view of a cross section of a building panel prior to creating an alternative intended edge of a finished building panel, FIG. 14B schematically illustrates a side view of the cross section in FIG. 14A after a step of a method to create indentations in the edges of a building panel, according to another embodiment of the inventive concept, FIG. 14C schematically illustrates a side view of the cross section in FIG. 14A after a step of a method, following the step in FIG. 14B, to create a bevel of a building panel, according to an embodiment of the inventive concept, FIG. 14D schematically illustrates a side view of the cross section in FIG. 14A after a step of a calibrating method, following the step in FIG. 14C, to create a mechanical locking device of a building panel, according to an embodiment of the inventive concept, FIG. 15A schematically illustrates a side view of a cross section of a building panel prior to creating another alternative intended edge of a finished building panel, FIG. 15B schematically illustrates a side view of the cross section in FIG. 15A after a step of a method to create indentations in the edges of a building panel, according to another embodiment of the inventive concept, FIG. 15C schematically illustrates a side view of the cross section in FIG. 15A after a step of a method, following the step in FIG. 15B, to create a bevel of a building panel, according to an embodiment of the inventive concept, FIG. 15D schematically illustrates a side view of the cross section in FIG. 15A after a step of a calibrating method, following the step in FIG. 15C, to create a substantially straight surface of the building panel, according to an embodiment of the inventive concept, FIG. 15E schematically illustrates a side view of the cross section in FIG. 15A after a step of a calibrating method, following the step in FIG. 15C, to create an angled surface of the building panel, according to an embodiment of the inventive concept.
Figure 13B:
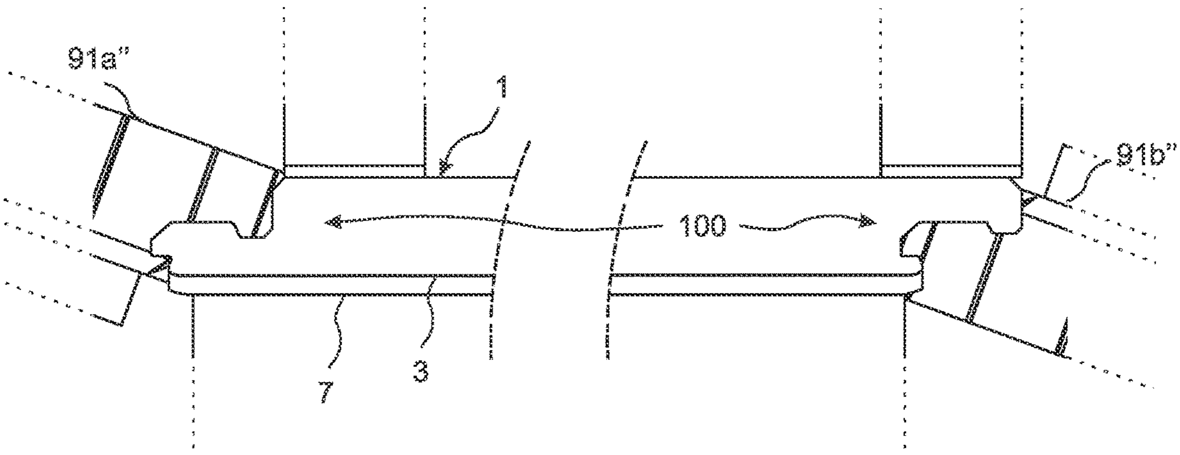
Figure 13C:
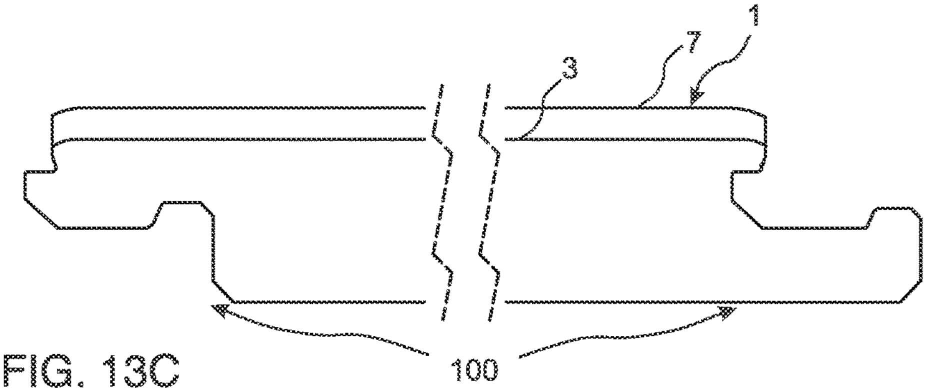

One of the milling devices 83*b* is further configured to remove material from the substrate 3 in order to prepare for the intended mechanical locking device 100 as illustrated in FIGS. 13A-13C.

The indentations 81*a*, 81*b* are located at a distance from the front surface 8 in a direction substantially perpendicular to the front surface 8. The indentations 81*a*, 81*b* may extend into the substrate 3, or into the surface layer 5, or into both the substrate 3 and the surface layer 5, in a direction substantially parallel to the front surface 8.

The indentations 81*a*, 81*b* are preferably temporary features of the edge 15, 16, 17, 18 of the building panel 1 which during a final shaping process i.e. a calibrating process, in no longer present in its original shape.

Figure 8A:
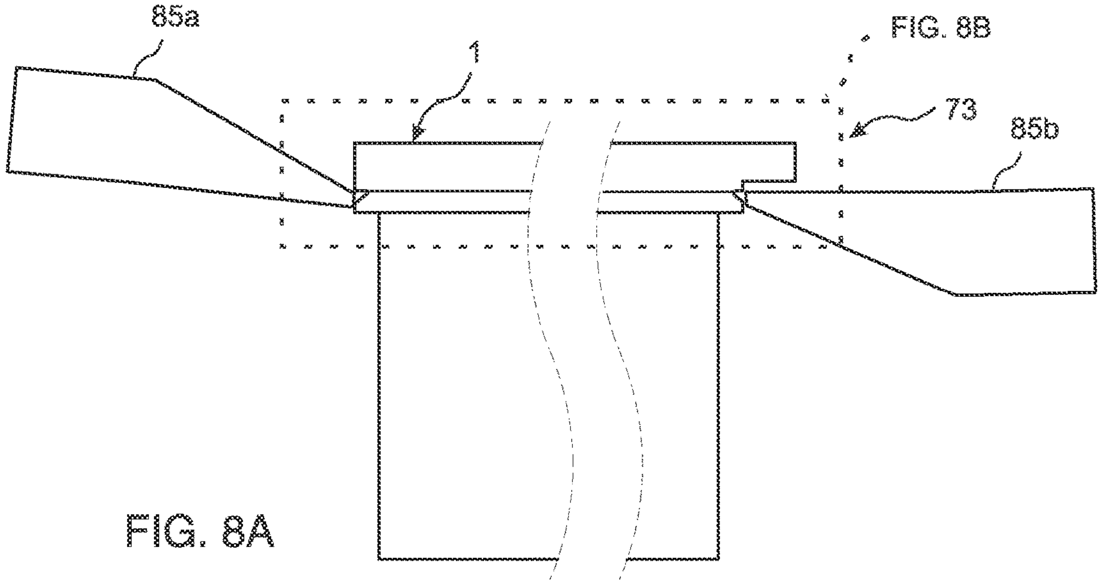
FIG. 8B is a detailed view of FIG. 8A, FIG. 9A schematically illustrates a third step of a method to create the intended edges of a building panel, according to an embodiment of the inventive concept.
Figure 8B:
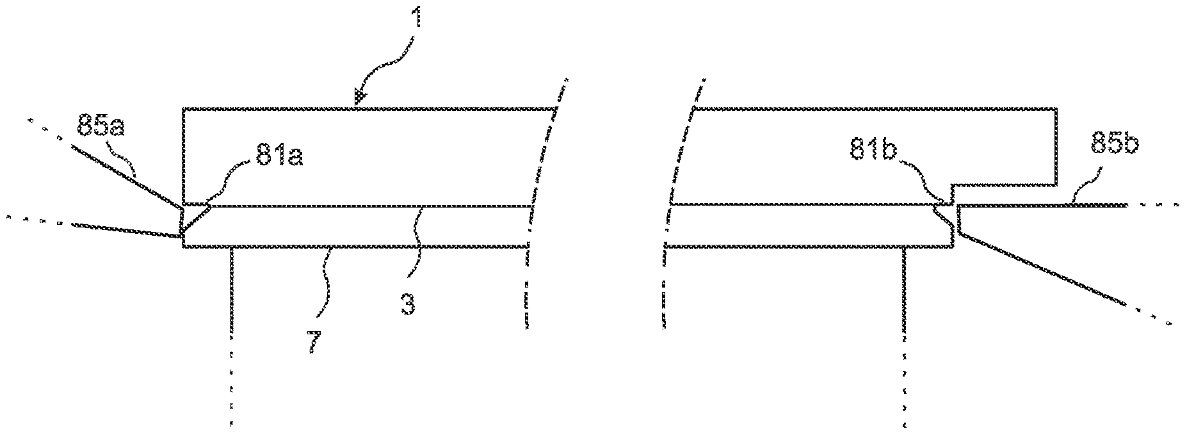

FIGS. 8A and 8B illustrate the next possible process which is a heating process 73. The heating process 73 is configured to heat an area along each edge of the building panel 1 necessary, to be able to form the bevel 10 in a later stage.

In an alternative set up for a process of forming the bevel (not shown), the heating process may be excluded, and the building panel is transported directly from the heat and pressure process when forming the building panel to the bevel forming process. In that set up the heat used when forming the building panel is used for forming the bevel, i.e. the area along the edges of the building panel, is still sufficiently hot for conducting the bevel forming process.

In another alternative set up for a process of forming the bevel (not shown), the heating process may be included in the bevel forming process, i.e. the two processes are not separate processes but incorporated with the bevel forming process in a combined heating and bevel forming process.

Thus, there are a multiple possible set ups for the manufacturing process, e.g. the bevel 10 is created simultaneously as the building panel is formed by means of heat and pressure (described below), or the bevel 10 is formed in a process subsequent of the process forming the building panel 1 but where the heat used in the process of forming the building panel 1 is sufficient for the subsequent bevel forming process, or the bevel 10 is formed in a process subsequent of the process forming the building panel 1 where the bevel forming process includes heating at least the area of the building panel 1 in which the bevel is to be created, or even having a bevel forming process without heat, just using pressure to form the bevel 10.

However, in the illustrated heating process 73 there is provided one heating device 85*a*, 85*b* on each side of the building panel 1. Each heating device 85*a*, 85*b* is configured to heat an area in the edges of the building panel 1 in which the bevel 10 is to be formed. The area which is heated on both sides preferably has a radius of at least 50% of the distance of which the indentation 81*a*, 81*b* extends into the building panel 1 from the opening of it. The temperature of the material in the area in which the bevel 10 is to be formed is preferably at least 40-220° C. or 70-180° C. and it may depend on various properties, such as the thickness of the material, the type of material. The heating devices 85*a*, 85*b* may use IR or UV-heating, hot air, laser, ultra sound or contact heat for heating the area.

Figure 9A:
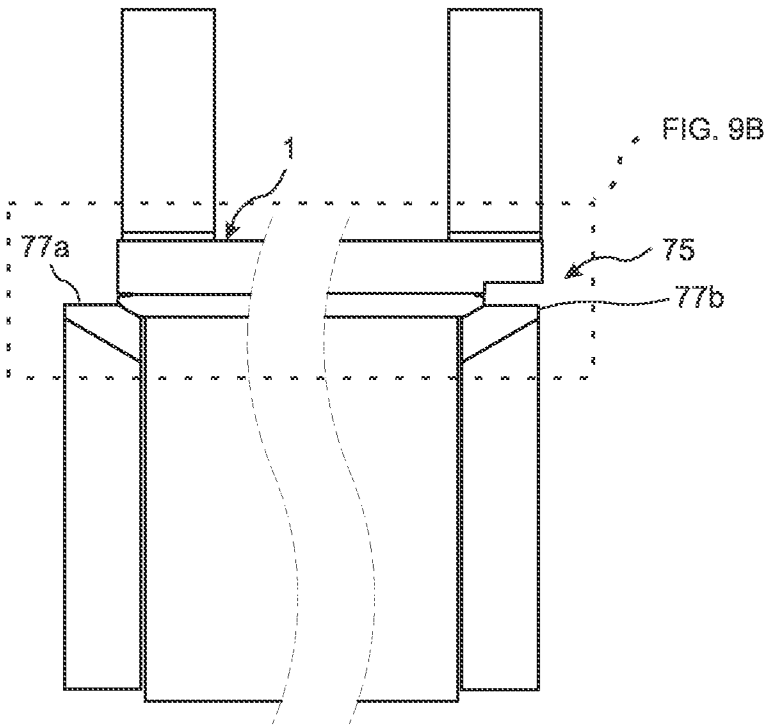
FIG. 9B is a detailed view of FIG. 9A, FIG. 9C schematically illustrates a side view of a cross section of the building panel after the third step in FIG. 9A, FIG. 10A schematically illustrates a fourth step of a method to create the intended edges of a building panel, according to an embodiment of the inventive concept.
Figure 9B:
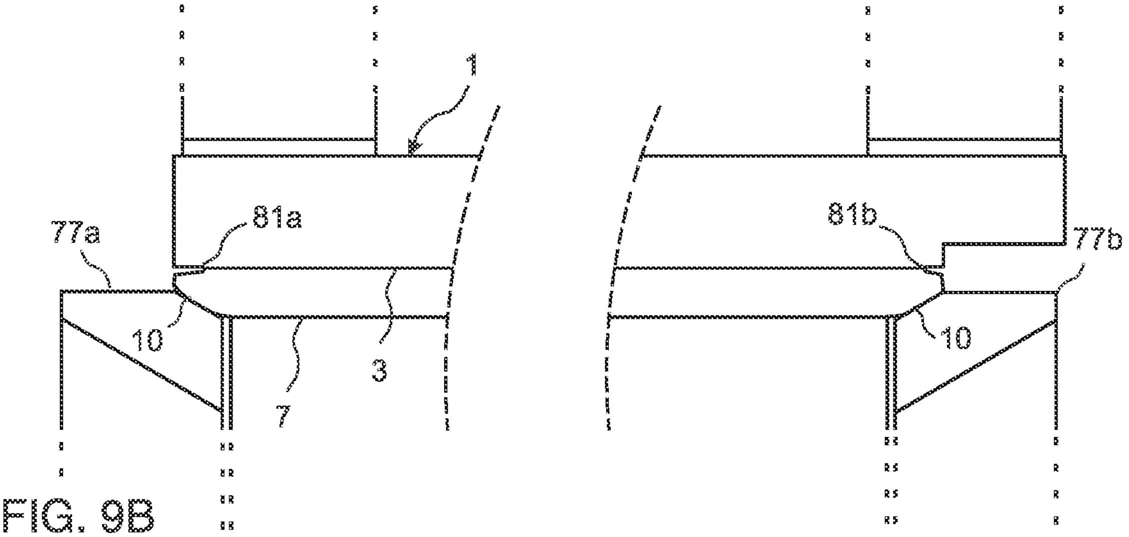
Figure 9C:
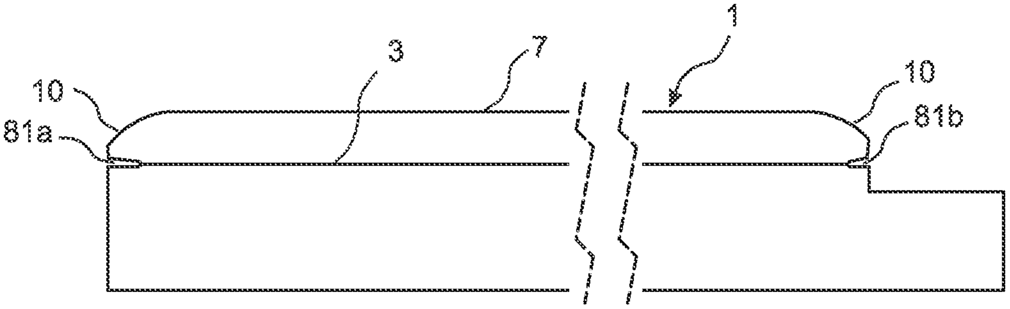

After the area has been heated in the heating process 73 the bevel 10 of the building panel 1 may be formed in a bevel forming process 75, see FIGS. 9A-9C. The bevel forming process 75 may begin with guiding the edges of the building panel 1 into the bevel forming process 75, e.g. by means of a guiding surface. The bevel forming process 75 is configured to form the bevel 10 either from above, i.e. the surface facing upwards, or from underneath, i.e. the surface facing down as can be seen in FIGS. 9A and 9B, by pressing on or shaping the surface layer 7 by means of a shaping device 77*a*, 77*b*, one on each side of the building panel 1. The shaping device 77*a*, 77*b* may be a pressing device.

Each shaping device 77*a*, 77*b* is configured to shape and press the surface layer 7 and in some embodiments at least partially the substrate 3 upwards (since it is processed up-side-down). During the shaping of the bevels 10, the shaping devices 77*a*, 77*b* press the material or at least the surface layer 7 in each area, which may be heated in the previous step, on each side of the building panel 1, where the bevel is to be formed, in a direction towards the indentations 81*a*, 81*b*. Thus the volume of the indentations 81*a*, 81*b* is decreased during the bevel forming process 75. The formed bevels 10 and the indentations 81*a*, 81*b* with decreased volume are illustrated in FIG. 9C.

The indentations 81*a*, 81*b* thereby allow at least the surface layer 7 to be pressed towards the substrate 3 such that the bevel 10 can be formed.

An alternative method (not shown) to the above described bevel forming process is to press the bevel 10 of the building panel 1 simultaneously as forming the building panel itself and joining the layers, i.e. the substrate and the surface layer, together. The at least one bevel 10 may be created with the same pressing device as used to forming the building panel. The pressing device may then preferably be provided with features, e.g. protrusions, for creating such bevel.

Figure 10A:
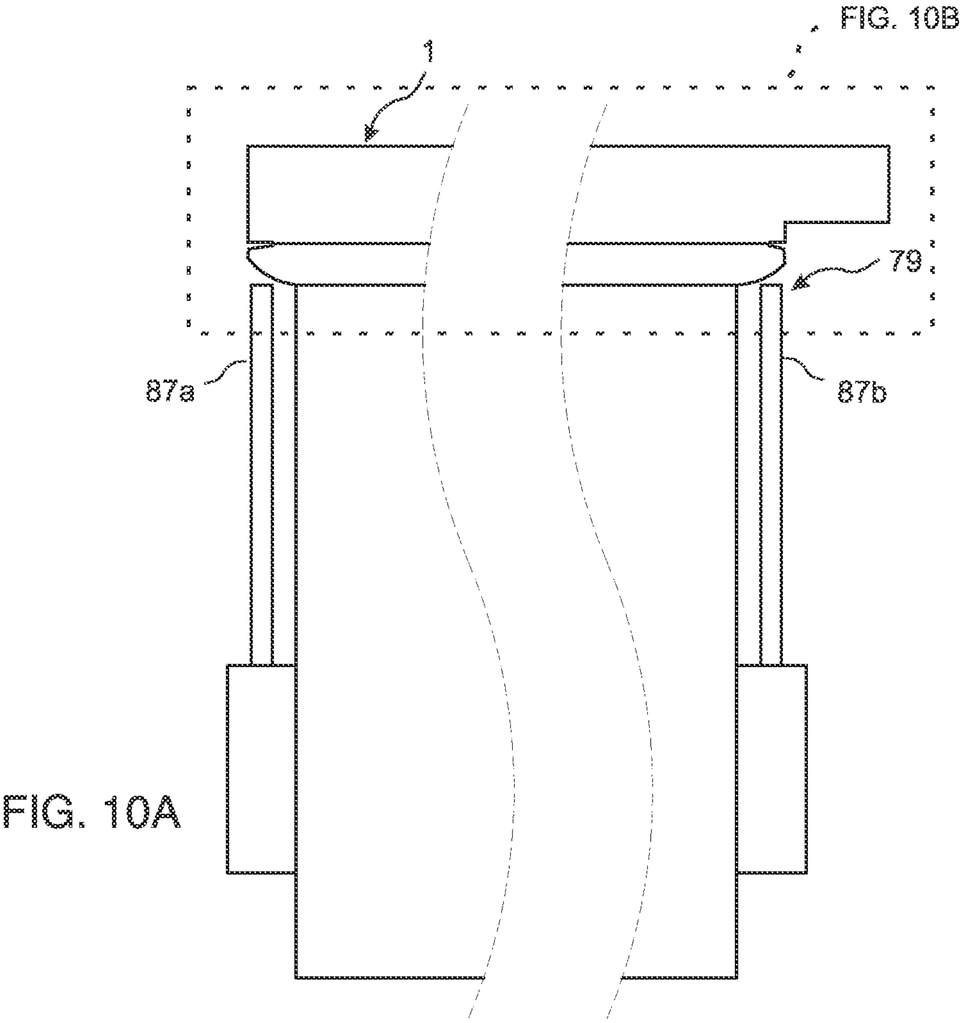
FIG. 10B is a detailed view of FIG. 10A, FIG. 11A schematically illustrates a step of a calibrating method to create the intended edges of a building panel, according to an embodiment of the inventive concept, FIG. 11B schematically illustrates a side view of a cross section of the building panel after the step in FIG. 11A, FIG. 12A schematically illustrates a step of another calibrating method to create the intended edges of a building panel, according to an embodiment of the inventive concept, FIG. 12B schematically illustrates a side view of a cross section of the building panel after the step in FIG. 12A, FIG. 13A schematically illustrates a step of yet another calibrating method to create the intended edges of a building panel, according to an embodiment of the inventive concept.
Figure 10B:
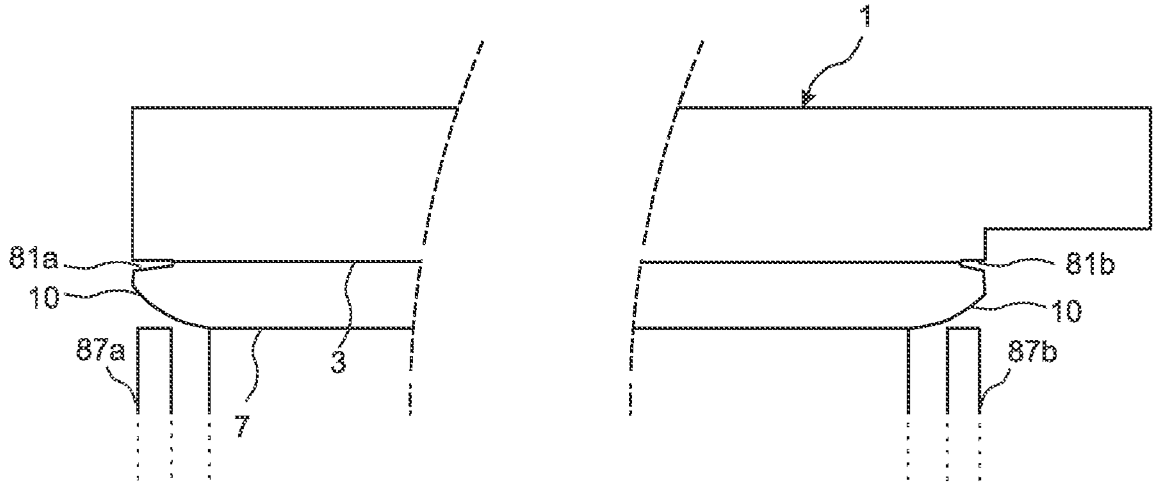

FIGS. 10A and 10B illustrate a cooling process 79 which is a preferred process step after forming the bevel 10 of the building panel 1. After and in the vicinity of the bevel forming process 75 there is arranged a cooling process 79 for cooling the bevel 10 and the area in the edges in which the bevel 10 has been formed. On each side of the building panel 1 there is provided a cooling device 87*a*, 87*b* configured to cool respective bevel 10 and area in the edges of the building panel 1. The cooling process is advantageous in order to prevent an undesirable elasticity and/or recovery effect in the material of the bevel 10 and in order to maintain the shape and proportions of the bevel 10.

The cooling process is preferably an active process in order to shorten the time compared to letting the temperature in the material decrease by means of the surrounding environment. The cooling process may be achieved by a cooling device using air, liquid, gas, solid materials and/or other suitable means. The cooling device may perform the cooling through, e.g., blowing, spraying, evaporation and/or through contact.

The cooling process may be configured to decrease the temperature, in the area of the material where the bevel is formed, between 15% and 40%. Depending on the type of cooling the cooling device uses and the temperature of such cooling the time spent by the cooling process may vary. For example, if cold water is used the cooling process may take between 2 sec. and 20 sec., and if cold air is used the cooling process may take between 30 sec. and 2 min, all depending on the type of cooling and the temperature.

FIGS. 11A and 11B, FIGS. 12A and 12B, and FIGS. 13A and 13B illustrate three different types of calibrating processes, i.e. final edge shaping processes, through which the building panel 1 might go through.

Figure 11A:
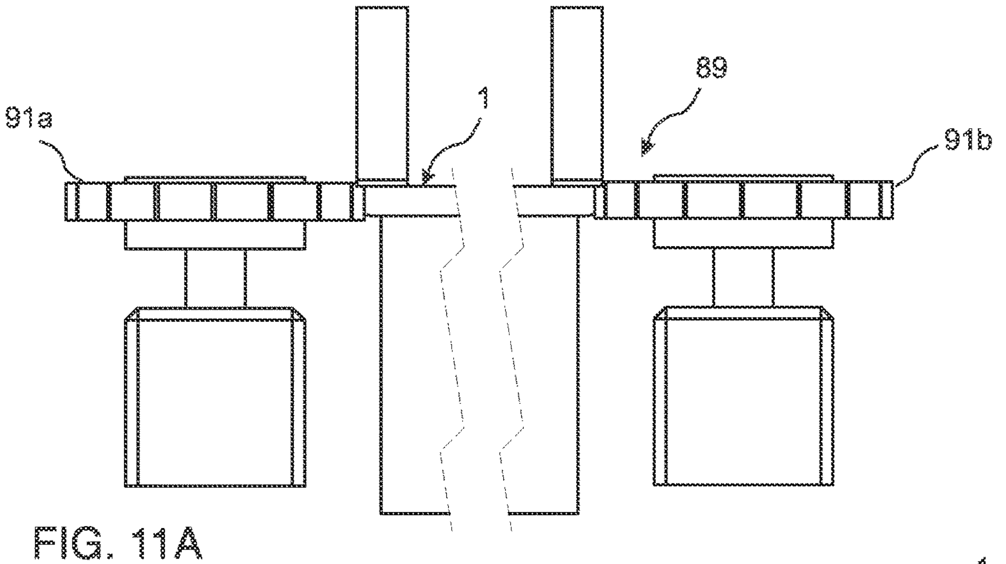
Figure 11B:
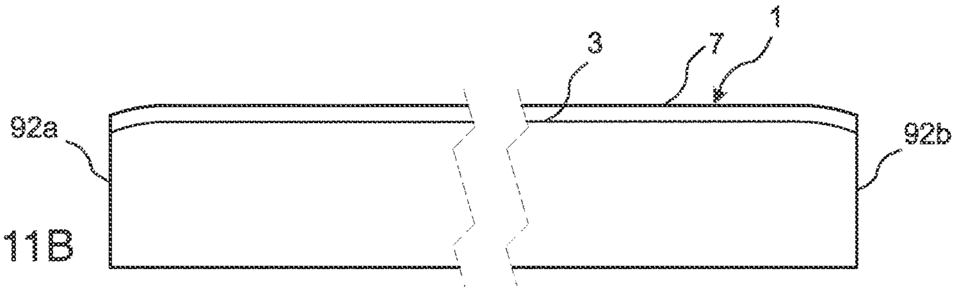

FIGS. 11A and 11B illustrate a first calibrating process including a second milling process 89 having a milling device 91*a*, 91*b* arranged on each side of the building panel 1. The milling devices 91*a*, 91*b* are configures to create a straight surface 92*a*, 92*b* along the edges of the building panel 1 as can be seen in FIG. 11B. The surfaces 92*a*, 92*b* of the edges extend in a direction perpendicular to the front surface 8. The surfaces 92*a*, 92*b* along the edges are preferably continuous surfaces.

If the building panel 1 was processed by the first milling process creating the indentation 81*a*, 81*b* then features of the indentations, e.g. gaps or similar, are removed during the calibrating process of creating the straight surfaces 92*a*, 92*b* of the edges. Further, the second milling process 89 is configured to create the desirable length of the bevel 10 and remove excess material from each edge of the building panel 1.

Figure 12A:
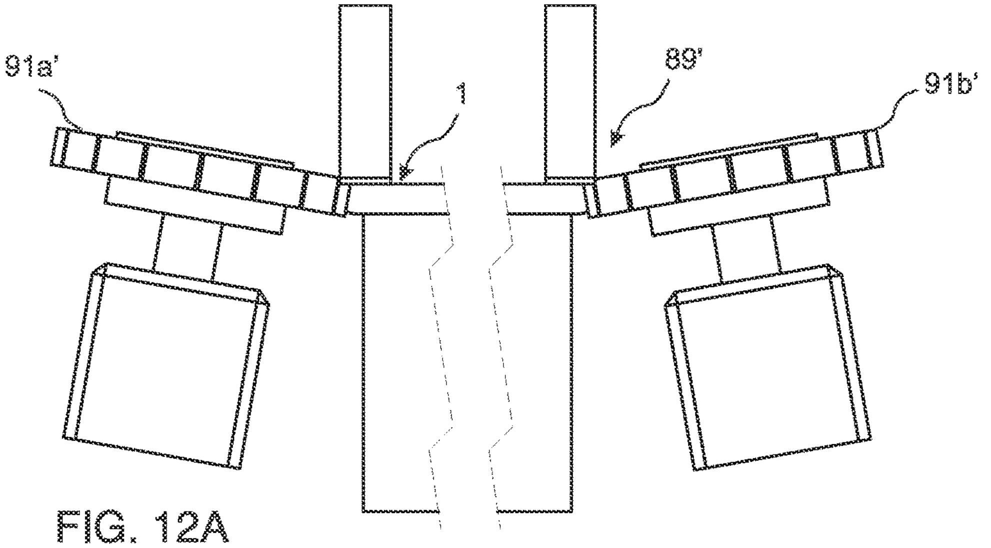
Figure 12B:
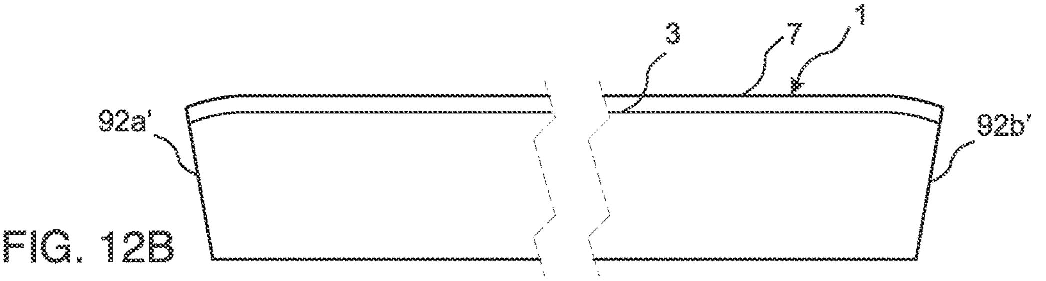

FIGS. 12A and 12B illustrate a second calibrating process including an alternative second milling process 89' having a milling device 91*a'*, 91*b'* arranged on each side of the building panel 1. The milling devices 91*a'*, 91*b'* are configured to create an angled surface 92*a'*, 92*b'* along the edges of the building panel 1 as can be seen in FIG. 17B. The surfaces 92*a'*, 92*b'* of the edges extend in a direction tilting inwards from the front surface 8 to the back surface 4 of the building panel 1. The surfaces 92*a'*, 92*b'* along the edges are preferably continuous surfaces.

If the building panel 1 was processed by the first milling process creating the indentation 81*a*, 81*b* then features of the indentations, e.g. gaps or similar, are removed during the calibrating process of creating the angled surfaces 92*a'*, 92*b'* of the edges. Further, the second milling process 89' is configured to create the desirable length of the bevel 10 and remove excess material from each edge of the building panel 1.

FIGS. 13A-13C illustrate a third calibrating process including another alternative second milling process 89". This second milling process 89" may include one or several milling devices 91*a"*, 91*b"* although two are illustrated in FIGS. 13A-13C. This second milling process 89" has a milling device 91*a"*, 91*b"* arranged on each side of the building panel 1. The milling devices 91*a"*, 91*b"* are configured to create a mechanical locking device 100, 100' along the edges of the building panel 1. One type of mechanical locking device 100 is illustrated in FIG. 13C. Other possible types of mechanical locking devices 100, 100' are described with reference to FIGS. 3A-5C. Depending on what type of mechanical locking device 100, 100' is to be created one or several milling devices 91*a"*, 91*b"* are present within the second milling process 89".

If the building panel 1 was also processed by the first milling process creating the indentation 81*a*, 81*b* then features of the indentations, e.g. gaps or similar, are removed during the calibrating process of creating the mechanical locking device 100, 100'. Further, the second milling process 89" is configured to create the desirable length of the bevel 10 and remove excess material from each edge 15, 16 of the building panel 1.

FIGS. 14A-14D illustrate a cross section of a building panel 1 finally processed in a slightly different way compared to what was illustrated and described with reference to FIGS. 6-13C. The alternative possible set up for final processing of the building panel 1 is suitable when having a substrate 3 being sufficiently able to be plastically deformed under the influence of pressure and preferably also heat.

Figure 14A:
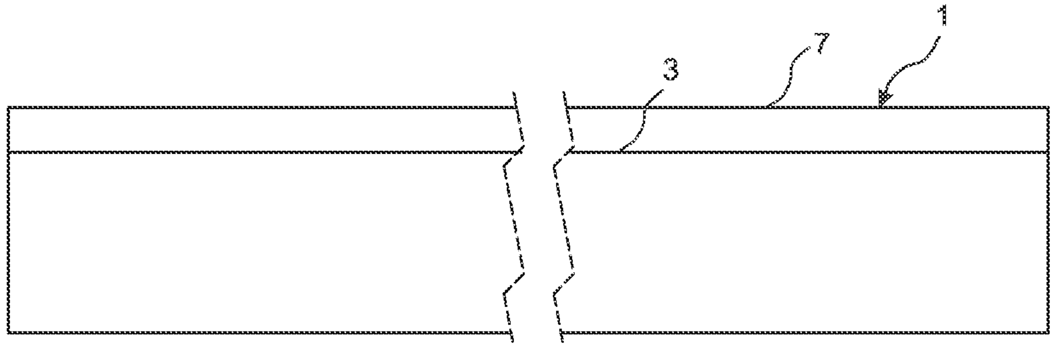

FIG. 14A illustrates the cross section of the building panel 1, before the final processing, with the substrate 3 and the surface layer 7 after being joined together by pressure and preferably also heat.

Figure 14B:
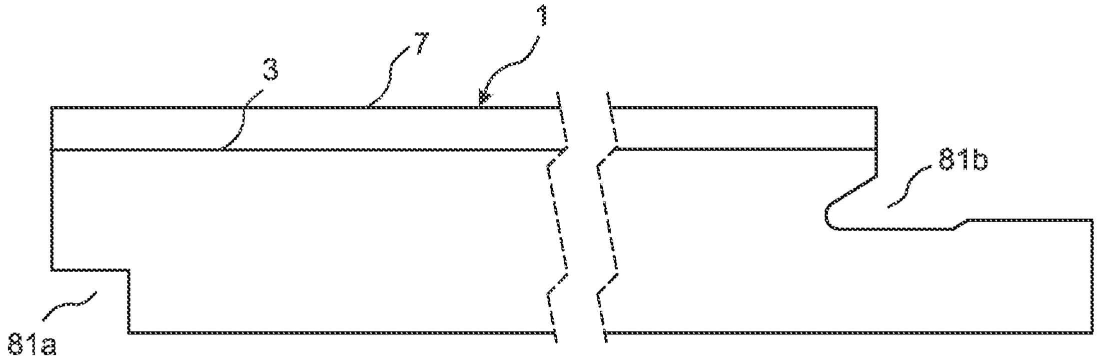

FIG. 14B illustrates the cross section of the building panel 1 after the process of creating indentations 81*a*, 81*b*. The indentations 81*a*, 81*b* are created such that their locations are suitable for the later intended calibrating process of the edges. In this example, the later intended calibrating process is a process to create a mechanical locking device and therefore the indentations 81*a*, 81*b* are created in positions matching the intended mechanical locking device.

As can be seen in FIG. 14B, the indentations 81*a*, 81*b* are partly or entirely created in the substrate 3. The indentations 81*a*, 81*b* are partly or entirely created in the substrate 3 at the edge portion. In order to form the bevels 10 the area of the building panel 1 between the indentations 81*a*, 81*b* and its surface in which the bevels are to be formed, which in the illustrated examples are the front surface 8 of the building panel 1, may need to be sufficiently heated. This may be achieved by any of the above described possible processes, e.g. by a separate heating process, by an incorporated heating process or by immediately transporting the building panel from the forming process when at least the area between the indentations 81*a*, 81*b* and the surface in which the bevels are to be formed is still sufficiently hot.

Figure 14C:
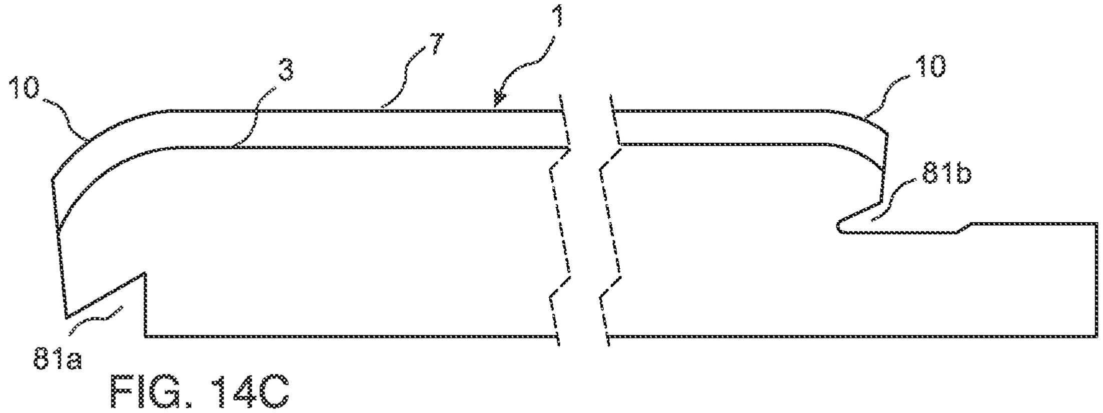

FIG. 14C illustrates the cross section of the building panel 1 after the bevels 10 have been formed and after the preferred cooling process 79. The volume of each the indentation 81*a*, 81*b* has been decreased since material from the area between the indentation 81*a*, 81*b* and the surface in which the bevel is now formed has been pressed into the indentation 81*a*, 81*b*. Thus, the shape of each indentation 81*a*, 81*b* has changed. The bevel 10 may be formed by applying pressure to an upper edge portion, thereby pressing an edge portion of the surface layer 5 towards the indentation 81*a*, 81*b*. The bevel 10 may be formed according to the method described above with reference to FIGS. 9A-9C.

Figure 14D:
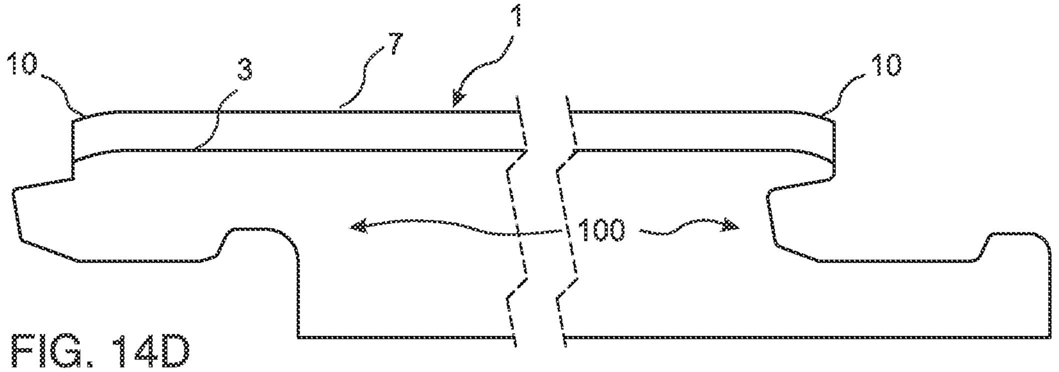

FIG. 14D illustrates the cross section of the building panel 1 after a calibrating process where a mechanical locking device 100 has been created in the edges of the building panel 1. The remaining indentations 81*a*, 81*b*, after the bevel forming process, have been removed during the calibrating process of creating the mechanical locking device 100. Further, the desirable length of the bevel 10 has been created by the calibrating process.

FIGS. 15A-15E illustrate a cross section of a building panel 1 finally processed in another slightly different way compared to what was illustrated and described with reference to FIGS. 6-13C and FIGS. 14A-14D. The alternative possible set up for final processing of the building panel 1 is suitable when having a substrate 3 being sufficiently plastically deformable under the influence of pressure and preferably also heat.

Figure 15A:
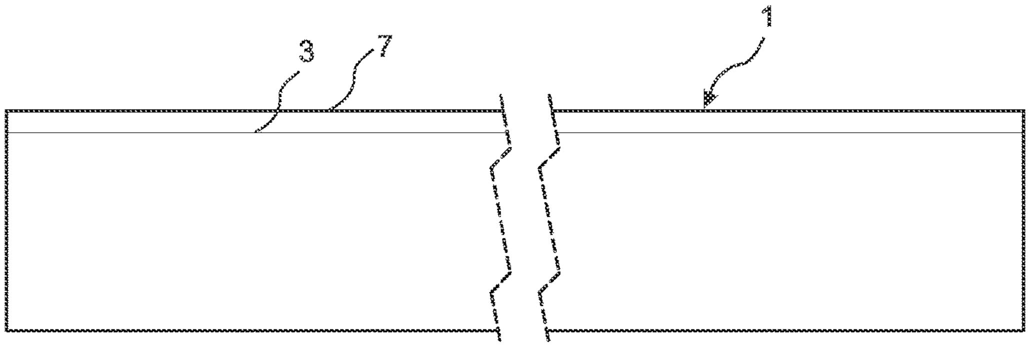

FIG. 15A illustrates the cross section of the building panel 1, before the final processing, with the substrate 3 and the surface layer 7 after being joined together by pressure and preferably also heat.

Figure 15B:
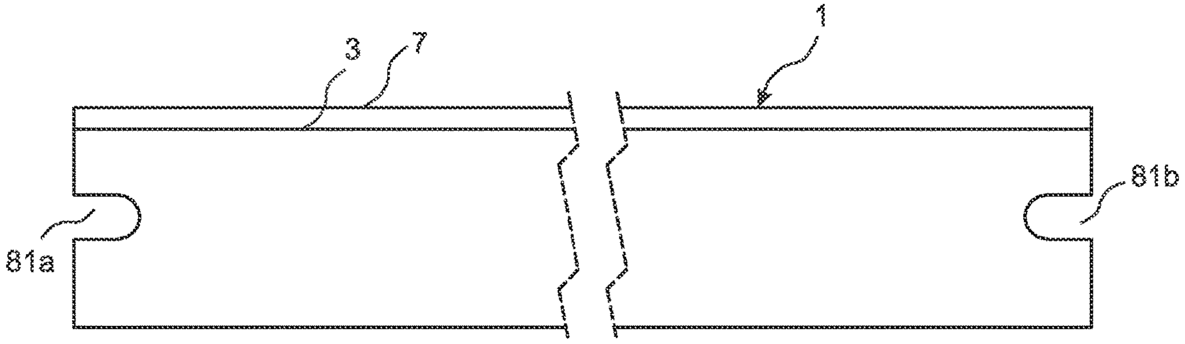

FIG. 15B illustrates the cross section of the building panel 1 after the process of creating indentations 81*a*, 81*b*. The indentations 81*a*, 81*b* are in this example substantially similar and arranged in the similar location along respective edges of the building panel 1. The indentations 81*a*, 81*b* are created such that their locations are suitable for the later intended calibrating process of the edges. In this example, the later intended calibrating process is a process to create a straight or an angled surface and therefore the indentations 81*a*, 81*b* are created in positions matching these types of surfaces.

As can be seen in FIG. 15B, the indentations 81*a*, 81*b* are entirely created in the substrate 3. The indentations 81*a*, 81*b* are entirely created in the substrate 3 at the edge portion. In order to form the bevels 10 the area of the building panel 1 between the indentations 81*a*, 81*b* and its surface in which the bevels are to be formed, which in the illustrated examples are the front surface 8 of the building panel 1, may need to be sufficiently heated. This may be achieved by any of the above described possible processes, e.g. by a separate heating process, by an incorporated heating process or by immediately transporting the building panel from the forming process when at least the area between the indentations 81*a*, 81*b* and the surface in which the bevels are to be formed is still sufficiently hot.

Figure 15C:
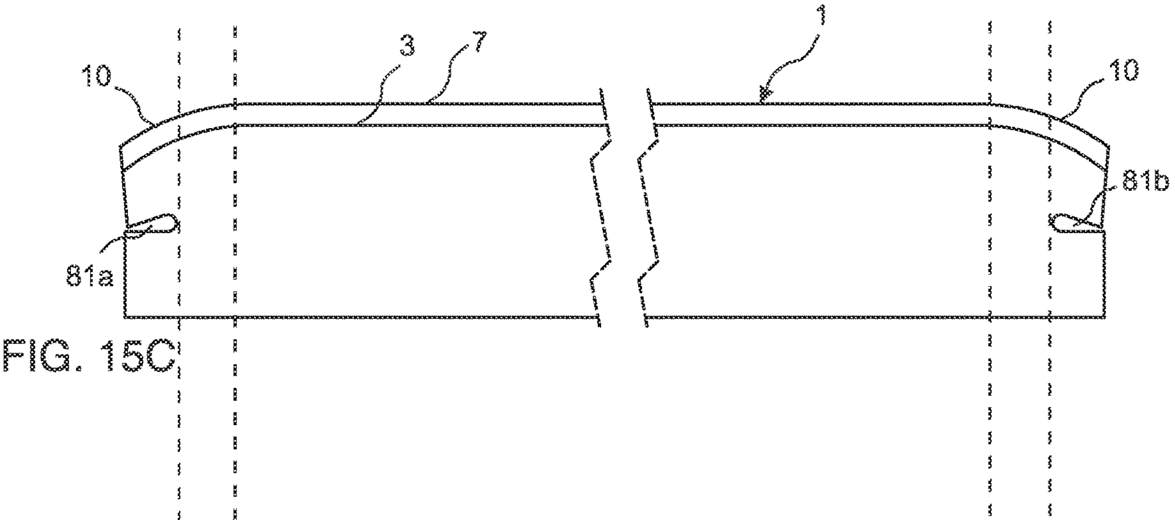

FIG. 15C illustrates the cross section of the building panel 1 after the bevels 10 have been formed and after the preferred cooling process 79. The volume of each the indentation 81*a*, 81*b* has been decreased since material from the area between the indentation 81*a*, 81*b* and the surface in which the bevel is now formed has been pressed into the indentation 81*a*, 81*b*. Thus, the shape of each indentation 81*a*, 81*b* has changed. The bevel 10 may be formed by applying pressure to an upper edge portion, thereby pressing an edge portion of the surface layer 5 towards the indentation 81*a*, 81*b*. The bevel 10 may be formed according to the method described above with reference to FIGS. 9A-9C.

Figure 15D:
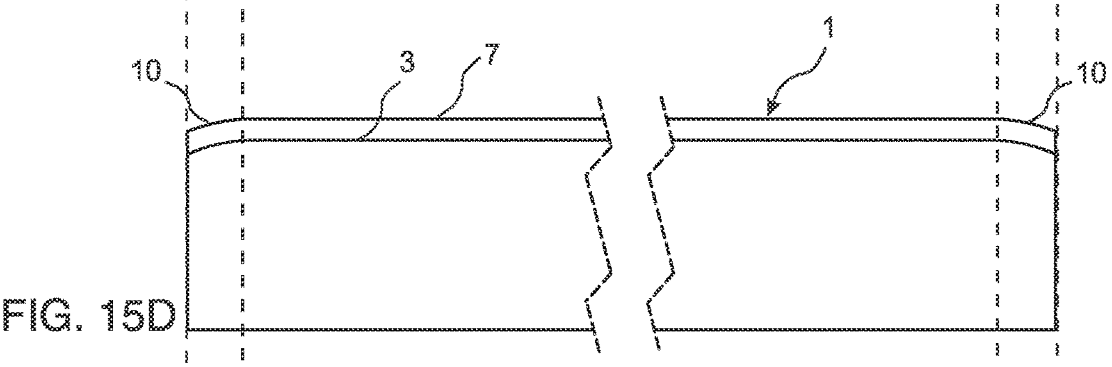

FIG. 15D illustrates the cross section of the building panel 1 after a calibrating process where a straight surface has been created in the edges of the building panel 1, preferably by the process described above with reference to FIG. 11A. The remaining indentations 81*a*, 81*b*, after the bevel forming process, have been removed during the calibrating process of creating the surface, as can be seen by means of the dotted lines in FIGS. 15C-15E. Further, the desirable length of the bevel 10 has been created by the calibrating process.

Figure 15E:
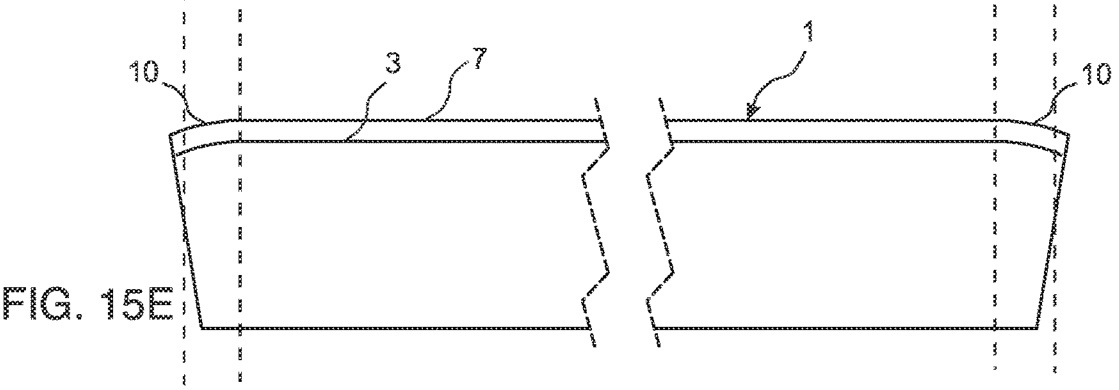

FIG. 15E illustrates the cross section of the building panel 1 after an alternative calibrating process where an angled surface has been created in the edges of the building panel 1, preferably by the process described above with reference to FIG. 12A. The remaining indentations 81*a*, 81*b*, after the bevel forming process, have been removed during the calibrating process of creating the surface, as can be seen by means of the dotted lines in FIGS. 15C-15E. Further, the desirable length of the bevel 10 has been created by the calibrating process.

In the embodiments described above, the bevel 10 may be provided with an embossing or structure. In an embodiment, the shaping device 77*a*, 77*b* for forming the bevel 10 may be configured to press an embossed pattern or a structure into the bevel during the forming of such. E.g. it may be desirable to have an embossing in the bevel following a specific pattern in a decorative layer of the surface layer for e.g. enhancing the decorative properties of the decorative layer in the bevel.

Finally, although the inventive concept has been described above with reference to specific embodiments, it is not intended to be limited to the specific form set forth herein. Rather, the invention is limited only by the accompanying claims. Other embodiments than the specific above are equally possible within the scope of the appended claims. All embodiments may be used separately or in combinations. Angles, dimensions, rounded parts, spaces between surfaces, etc. are only examples and may be adjusted within the basic principles of the invention.

The invention claimed is:

1. A method to manufacture a bevel at least partly along at least one edge of a building panel, wherein said building panel comprises a polymer-based material, the method comprising:

creating an indentation in an edge portion of the at least one edge of the building panel, wherein the indentation is located at a distance from a surface of the building panel in which surface the bevel is to be formed, in a direction substantially perpendicular to the surface of the building panel, heating at least an area between the indentation and the surface of the building panel in which the bevel is to be formed, applying pressure to the surface for forming a bevel of the building panel, wherein the indentation includes an opening at the edge portion, wherein a height of the opening at the edge portion, prior to forming the bevel, exceeds a total height of the bevel after forming the bevel.

2. The method according to claim 1, wherein the polymer-based material of the building panel is a thermoplastic material.

3. The method according to claim 2, wherein the building panel comprises an amount of at least 10 wt % of the thermoplastic material.

4. The method according to claim 1, wherein the building panel comprises a substrate comprising a polymer-based material, and a surface layer, wherein the surface layer comprises a decorative layer.

5. The method according to claim 4, wherein the decorative layer is a printed polymer-based sheet.

6. The method according to claim 4, wherein the surface layer further comprises a wear layer.

7. The method according to claim 4, wherein the polymer-based material of the substrate is a thermoplastic material.

8. The method according to claim 7, wherein the substrate comprises an amount of at least 10 wt % of the thermoplastic material.

9. The method according to claim 4, wherein the indentation is located at least partly in the substrate.

10. The method according to claim 4, wherein the indentation is located at least partly in the surface layer.

11. The method according to claim 1, wherein the indentation extends along the entire length of the at least one edge of the building panel.

12. The method according to claim 1, wherein the indentation extends into the edge portion of the at least one edge in a direction substantially parallel to the surface of the building panel.

13. The method according to claim 1, further comprising:
cooling the bevel by means of a cooling device, at least partly in the area between the indentation and the surface of the building panel.

14. The method according to claim 13, wherein cooling is applied during applying pressure to the surface for forming a bevel of the building panel.

15. The method according to claim 4, wherein the indentation extends across a boundary between the substrate and the surface layer.

* * * * *